US007139316B2

(12) United States Patent
Yoshinari

(10) Patent No.: US 7,139,316 B2
(45) Date of Patent: Nov. 21, 2006

(54) SYSTEM METHOD AND APPARATUS FOR SEAMLESSLY SPLICING DATA

(75) Inventor: Hiromi Yoshinari, Kanagawa (JP)

(73) Assignee: Sony Corporation, Tokyo (JP)

( * ) Notice: Subject to any disclaimer, the term of this patent is extended or adjusted under 35 U.S.C. 154(b) by 813 days.

(21) Appl. No.: 10/282,784

(22) Filed: Oct. 29, 2002

(65) Prior Publication Data

US 2003/0067989 A1    Apr. 10, 2003

Related U.S. Application Data

(63) Continuation of application No. 09/275,999, filed on Mar. 25, 1999, which is a continuation of application No. PCT/JP98/03332, filed on Jul. 27, 1998, now Pat. No. 6,567,471.

(30) Foreign Application Priority Data

Jul. 25, 1997    (JP)    ............................ 9-199923

(51) Int. Cl.
    *H04N 7/12*    (2006.01)
    *H04B 1/66*    (2006.01)

(52) U.S. Cl. .............................................. 375/240.25

(58) Field of Classification Search ............ 375/240.25, 375/240.26, 240.01; H04N 7/12; H04B 1/66
See application file for complete search history.

(56) References Cited

U.S. PATENT DOCUMENTS

| | | |
|---|---|---|
| 5,602,592 A | 2/1997 | Mori et al. |
| 5,982,436 A | 11/1999 | Balakrishnan et al. |
| 6,025,878 A | 2/2000 | Boyce et al. |
| 6,137,834 A | 10/2000 | Wine et al. |
| 6,529,555 B1 * | 3/2003 | Saunders et al. ...... 375/240.26 |
| 6,611,624 B1 * | 8/2003 | Zhang et al. ................ 382/232 |

(Continued)

FOREIGN PATENT DOCUMENTS

EP    0 694 921    1/1996

(Continued)

OTHER PUBLICATIONS

Wee S J et al: "Splicing MPEG Video Streams in the Compressed Domain" IEEE Workshop on Multimedia Signal Processing. Proceedings of Signal Processing Society Workshop on Multimedia Signal Processing, XX, XX Jun. 23, 1997, pp. 225-230, XP000957700.

*Primary Examiner*—Tung Vo
(74) *Attorney, Agent, or Firm*—Frommer Lawrence Haug LLP; William S. Frommer

(57) ABSTRACT

A plurality of bit streams are seamlessly spliced. Separate decoders decode each bit stream. A controller selects the decoded pictures according to a re-encoding range in the vicinity of a splicing point of the bit streams. Pictures presenting a reordering of the streams are excluded in the selection of the decoded pictures. An encoder re-encodes the pictures within the re-encoding range. When it is determined that crossover motion compensation exists between pictures of different streams, the controller changes the motion prediction direction of the problematic picture. The controller changes a motion prediction picture type of a picture which is improperly motion predicted with reference to another stream. A quantization characteristic or motion vectors for the new picture type are generated by the controller. The controller effects the encoding in accordance with a target amount of bits to prevent a breakdown of a buffer and a discontinuation of an amount of data occupancy thereof. A multiplexer multiplexes the original streams with the re-encoded stream to produce a seamless bit stream.

35 Claims, 32 Drawing Sheets

U.S. PATENT DOCUMENTS 6,760,377 B1 * 7/2004 Burns et al. ............ 375/240.15
6,983,015 B1 * 1/2006 Saunders et al. ........ 375/240.1

FOREIGN PATENT DOCUMENTS

| EP | 0 742 674 | 11/1996 |
| JP | 06253331 A | 9/1994 |
| JP | 08037640 A | 2/1996 |
| JP | 08149408 A | 6/1996 |
| JP | 10112840 A | 4/1998 |
| WO | WO 96 17492 | 6/1996 |
| WO | WO 97 08898 | 3/1997 |

\* cited by examiner

SYSTEM METHOD AND APPARATUS FOR SEAMLESSLY SPLICING DATA

This is a continuation of co-pending International Application PCT/JP98/03332 having an international filing date of Jul. 27, 1998.

BACKGROUND OF THE INVENTION

1. Field of the Invention

The present invention relates to an editing system, method and apparatus for editing images and, more particularly, an editing system, method and apparatus for seamlessly splicing a plurality of bit streams of video data.

2. Related Art

Recording/reproducing systems have recently been introduced which record/reproduce high quality audio/video data utilizing compression schemes. High quality recording/reproducing systems compression-encode/decode the audio/video data utilizing the MPEG (Moving Picture Experts Group) standard. One example of such a system is the DVD (Digital Versatile Disk or Digital Video Disk), which provides a powerful means by which unprecedented quantities of high quality audio/video are compressed on an optical disk.

FIG. 1 illustrates the general recording/reproducing system. The video encoder ill of the encoding-side apparatus 110 encodes input video data $D_V$ in accordance with the MPEG standard to thereby produce a video elementary stream (video ES). The packetizer 112 packetizes the video elementary stream into a video packetized elementary stream (video PES) comprising access units; each access unit representing a picture in a group of pictures making up a portion of the video program. The audio encoder 113 of the encoding-side apparatus encodes input audio data $D_A$ to thereby produce an audio elementary stream (audio ES) The packetizer 114 formats the audio elementary stream into an audio packetized elementary stream (audio PES) comprising access units; each access unit represent decodable segment of an audio bit stream. The transport stream multiplexer 115 multiplexes the audio and video packetized elementary streams to thereby produce a transport stream packet. A Video Buffer Verifier (VBV) buffer (not shown) stores/retrieves the multiplexed streams at a variable target rate which is controlled in accordance with the number of bits to be encoded and the capacity of the VBV buffer. An illustration of the Video Buffer Verifier is provided with reference to FIG. 2.

The decoding-side apparatus 120 of FIG. 1 stores in a decoding-side Video Buffer Verifier (VBV) buffer (not shown) the received transport stream which is transmitted via the transmission medium 116. The transport stream demultiplexer 121 demultiplexes the received transport stream fetched from the decoding buffer at a timing determined by a decoding time stamp (DTS) to thereby reproduce the video packetized elementary stream (video PES) and the audio packetized elementary stream (audio PES). The video packetized elementary stream is depacketized by depacketizer 122 and decoded by video decoder 123 thereby reproducing the video data $D_V$. The audio packetized elementary stream is depacketized by depacketizer 124 and decoded by audio decoder 125 thereby reproducing the audio data $D_A$. For DVD applications, the transport stream multiplexer 115 and the transport stream demultiplexer 121 are respectively replaced with a program stream multiplexer and demultiplexer which DVD format/unformat the encoded bit streams.

In the recording/reproducing system of FIG. 1, it is desirable to seamlessly splice a plurality of bit streams by concentrating at the transport level two or more different elementary streams representing the merger of different video programs. In digital broadcasting, for example, editors at a broadcasting station splice a plurality of bit streams from different video sources such as, for example, live video feeds received from local stations for generating a spliced broadcast video program. In DVD applications, the director splices movie scenes to be recorded on the DVD optical disk. In another DVD application, the DVD decoder splices multiple bit streams reproduced from the DVD optical disk in response to user-entered actions which is particularly useful for generating alternate scenes for interactive movies and video games.

There are, however, unforeseen difficulties to splicing a plurality of bit streams using the MPEG compression standard. In order to illuminate the problem, a closer look at MPEG is warranted. In summary, the MPEG standard implements a compression process which includes motion-compensated predictive coding in conjunction with adaptive Discrete Cosine Transform (DCT) quantization. The motion-compensated predictive coding predicts motion in each image frame/field using both unidirectional and bidirectional motion prediction. The DCT quantization adaptively compresses each frame/field in accordance with the motion-compensated prediction. The term "frames" hereinafter refers to pictures in general including frames as well as fields.

As illustrated in FIG. 3(a), motion-compensated prediction of the MPEG compression standard classifies the frames into one of three types: intracoded-frames (I-frames), predictively coded frames (P-frames) and bi-directionally coded frames (B-frames). MPEG establishes the I-frames as the reference by which the B- and P-frames are encoded and, thus, preserves the I-frames as complete frames. The I-frames are considered "intra-coded" since they proceed as complete frames, having bypassed the motion-compensated prediction, to the DCT quantization whereupon each I-frame is compression encoded with reference only to itself. P-frames, which rely on forward temporal prediction, are coded using the previous I- or P-frame. B-frames are coded using bi-directional (forward and/or backward) motion compensated predictive encoding using the two adjacent I- and/or P-frames. B- and P-frames are considered "inter-coded" since they are motion-prediction encoded with reference to other frames FIG. 7 illustrates an example of the direction of prediction for each I, B and P-frame in a group of pictures (GOP) as indicated by the arrows in the figure.

In accordance with the MPEG standard, frames are arranged in ordered groups of pictures (GOP), each group of pictures comprising a closed set of I-, B- and P-frames which are encoded with reference to only those frames within that group. FIG. 3(a) illustrates the natural presentation order (1 to 15) of the GOP in which the pictures are naturally presented to the viewer. Since the B- and P-frames within the GOP are encoded with reference to other frames, the MPEG standard dictates that the natural presentation order shown in FIG. 3(a) be rearranged into the decoding order shown in FIG. 3(b) in which the frames are to be decoded and transmitted in the coded order shown in FIG. 3(c). With this arrangement, the frames necessary for decoding other frames are first decoded to provide the basis upon which the following inter-coded frames are decoded. For example, an I-frame which forms the reference by which the following frames in the GOP are motion-compensation predicted is positioned first in the decoding order. Once decoded, the pictures are rearranged in their natural presentation order for display to the viewer.

Motion-compensated predictive coding divides each I-, B- and P-frame into 8×8 pel macroblocks. The motion vectors for a present frame are motion-compensation predicted with reference to the motion vectors of another frame which is selected in accordance with the direction of prediction of the type of frame (e.g., I-, B- or P-frame) For example, P-frame macroblocks are motion-predicted with reference to the macroblocks in a previous I or P-frame; B-frame macroblocks are motion-predicted with reference to the previous/successive I- and/or P-frames. The I-frames, which are not inter-coded, bypass motion compensation and are directly DCT quantized.

The process for motion-predicting a current picture in a GOP is illustrated in FIGS. 4(a)–(e). The GOP are input in the natural presentation order shown in FIG. 4(a), rearranged in accordance with the decoding order shown in FIG. 4(b), motion-predicted utilizing two frame memories (FM1, FM2) as shown in FIGS. 4(c) and (d) and output in the form of the encoding stream (ES) shown in FIG. 4(e). For example, the I-frame (I3) of FIG. 4(b) is intra-coded and, therefore, output directly to the encoding stream (ES); the B-frame (B1) of FIG. 4(b) is motion predicted with reference to the I-frame (I3) stored in the first frame memory (FM1) of FIG. 4(c) and the P-frame (P) stored in the second frame memory (FM2) of FIG. 4(d); the P-frame (P6) of FIG. 4(b) is motion predicted with reference to the I-frame (I3) stored in the first frame memory (FM1) of FIG. 4(c). From the foregoing illustration, it is apparent that a minimum of two frame memories are needed for bi-directional motion prediction.

After the motion vectors are calculated, each macroblock is Discrete Cosine Transform (DCT) encoded. More particularly, the macroblocks are transformed from pixel domain to the DCT coefficient domain. Next, adaptive quantization is performed on each block of DCT coefficients in accordance with a variable quantization step size. After adaptive quantization is applied to the DCT coefficients, the coefficients undergo further compression involving such techniques as differential coding, run-length coding or variable length coding. The encoded data is stored/retrieved to/from the Video Buffer Verifier (VBV) buffer at a controlled target bit rate in the form of a serial bit stream.

FIG. 2 illustrates a locus of the data occupancy of the VBV buffer wherein the bits (oordinate) of the I-, B- and P-frames are stored in the VBV buffer along a time axis (presentation time $T_p$-abscissa) at a transmission bit rate (inclination 131) and output from the VBV buffer as indicted by the vertical lines. The VBV buffer is considered a "virtual" buffer because it emulates the buffer on the decoding side. By controlling the amount of bits 132 of the VBV buffer on the encoding side, it can be assured that the appropriate amount of bits per decoding time stamp (DTS), i.e. target bit rate, is transmitted to the decoding side. This is important in MPEG where the number of bits for a particular frame varies depending upon the motion-prediction type. The I-frames in FIG. 2, for example, require four times the amount of storage time (VBV buffer delay) as the P-frames and twice the B-frames. For that matter, care must be taken that the varied amount of bits in a GOP does not cause an overflow when the number of bits exceeds the buffer capacity (upper-hatched line) or an underflow when the number of bits drops below a predetermined minimum number (lower-hatched line) which will sustain an efficient encoding/decoding process.

Referring to FIGS. 5A–C, the decoding process for decoding the transmitted group of pictures (GOP) is explained. The coded order shown in FIG. 5(a) is received by the decoding side apparatus 120 (FIG. 1) and stored in the decoding-side VBV buffer. The transport stream demultiplexer 121 demultiplexes the stream into the packetized elementary stream illustrated in FIG. 5(b). The GOP are decoded by fetching the compressed picture data from the decoding-side buffer at a timing determined by the decoding time stamp (DTS), de-compressing the fetched picture data and reconstructing each I-, B- and P-frame from the decompressed picture data. It will be appreciated that the I-frames are complete upon decompression. The B- and P-frames are reconstructed by motion estimating the previously decoded frames based on the decompressed motion vectors of the current B- or P-frame. Afterwards, the decoded frames are rearranged in their original presentation order for display as shown in FIG. 5(c).

When it is considered that the decoding-side apparatus requires relatively less hardware complexity than the encoding-side, the wisdom of the MPEG encoding/decoding scheme will be immediately recognized. To explain, the complex hardware necessary to perform motion prediction is not a part of the decoding-side apparatus since the decoder need only apply the motion vectors to the encoded pictures. The high quality audio/video is, thus, generated by a high-end encoder for distribution enmasse to numerous, considerably less-complex (and less-expensive) decoders.

The motion decoding process is illustrated in FIGS. 6(a)–(d) wherein FIG. 6(a) shows the coded video elementary stream (ES) which is supplied to the decoder. A first frame memory (FM1) as illustrated in FIG. 6(b) stores a first previously-decoded picture for decoding the current picture. A second frame memory (FM2) as illustrated in FIG. 6(c) stores a second previously-decoded picture for decoding the current picture. For example, the decoded I-frame (I3) (first picture in the ES of FIG. 6(a)) is stored in the first frame memory (FM1) and the P-frame (previous ES) is stored in the second frame memory (FM2). In this example, the B-frame (B1) is decoded by motion estimating the frames in the frame memories (FM1, FM2) based on the motion vectors of B1. The decoded GOP are output in the presentation order illustrated in FIG. 6(d)

With the rudiments of the MPEG standard explained, the difficulties confronted when splicing coded streams will be better appreciated. In the conventional editing system for splicing bit streams, it is recognized that the bit streams must be decoded. This is because the prediction direction of the first stream may be inconsistent with that of the second. To explain, the selected direction of prediction (forward/backward) for the B-frames mutually effects the prediction direction of other B-frames and, for that matter, defines which frames are selected for the motion prediction throughout the GOP. When two coded bit streams are spliced arbitrarily, for example, the prediction direction for a frame in the first coded bit stream may be decoded with reference to a frame with an inconsistent prediction direction in the second coded bit stream. For this reason, motion estimation upon decoding in the area of the splicing point will result in reconstructing an incorrect picture. The error, referred to as a discontinuity, migrates to other frames in motion estimation, consequently effecting the motion estimation decoding of the GOP as a whole. This discontinuity manifests as visible macroblocks on the display when, for example, the channel of a digital television is changed.

In order to prevent discontinuity, it is suggested to decode the bit streams before splicing. When the bit streams are decoded, the frames thereof are not motion predicted, i.e., not encoded with reference to other frames and thus are not subject to the discontinuity of the foregoing method. However, the spliced bit stream must be re-encoded. Since MPEG coding is not a 100% reversible process, the signal quality is deteriorated when re-encoding is performed. The problem is compounded because the re-encoding process encodes a decoded signal, i.e., a degraded version of the original audio/video signal.

A splicing technique which addresses signal deterioration selectively decodes the bit streams at a splicing point. However, such a splicing technique produces unsatisfactory results. The first problem arises in the presentation order of the spliced stream which may be understood with reference to FIGS. 8(a)–(d) to 9(a)–(d). FIGS. 8(a)–(d) illustrate the ideal case where no problems arise in the presentation order of the spliced stream $ST_{SP}$. In this case, stream $ST_A$ of FIG. 8(a) is spliced at the splicing point SPA with stream $ST_B$ of FIG. 8(b) at the splicing point $SP_B$. Thus, the spliced bit stream $ST_{SP}$ of FIG. 8(c) presents the pictures of stream $ST_A$ followed by the pictures of stream $ST_B$ without problem.

FIGS. 9(a) to (d) illustrate the problem where the decoder rearranges the presentation order of the spliced bit stream. Stream $ST_A$ of FIG. 9(a) is bit-spliced with stream $ST_B$ of FIG. 9(b) at respective splicing positions ($SP_A$, $SP_B$). Unlike the ideal case, the decoder on the decoding-side rearranges the order of presentation of the frames of the spliced bit stream $ST_{SP}$ (FIG. 9(c)) such that, in this example, the last frame (P-frame) in bit stream $ST_A$ is inserted at the third-picture position of stream $ST_B$. This appears visually as an arbitrary picture inserted in the video program.

The second problem, hereinafter termed "crossover", arises in motion estimation upon decoding of the spliced bit stream. In the ideal case illustrated in FIGS. 10(a), (b) the motion estimation reconstructs the pictures of stream $ST_A$ of the spliced bit stream $ST_{SP}$ of FIG. 10(a) with reference to only those frames from that stream. This is indicated by the arrows in FIG. 10(b) which represent the motion estimation direction. Likewise, stream $ST_B$ is motion estimated with reference to only those pictures in that stream.

FIGS. 11(a) and (b) illustrate the problem of crossover motion estimation. For example, the P-frame in stream $ST_A$ is based on frames in stream $ST_B$ as illustrated by the hatched arrows labeled "NG" in FIG. 11(b). Thus, the P-frame in stream $ST_B$ is reconstructed from the wrong picture which appears visually as a distorted image. This problem is propagated through the GOP as shown in FIGS. 12(a), (b) when the incorrectly-estimated P-frame of stream $ST_B$ is utilized by the decoder to motion estimate other frames. This results in a number of distorted pictures which are quite noticeable.

FIGS. 13(a) to 18(b) illustrate the third problem of underflow/overflow related to splicing bit streams. The ideal case is illustrated in FIGS. 13(a)–(d) wherein three streams ($ST_A$, $ST_B$, $ST_C$) are spliced at splicing points $SP_V$ and a buffer occupancy $V_{OC}$. FIG. 13(a) illustrates the locus of the data occupancy of the video buffer verifier (VBV) buffer on the decoding side wherein I-, B- and P-frames are stored in the VBV buffer. FIG. 13(b) illustrates the spliced stream $ST_{SP}$, FIG. 13(c) the timing at which each of the pictures is generated after rearrangement and FIG. 13(c) the order of the pictures after the decoding operation. As will be appreciated from FIG. 13(a), the instant case does not present a problem of overflow (upper-hatched line) or underflow (lower-hatched line).

The problematic case is illustrated in FIGS. 14(a)–16(b). By themselves, bit streams $ST_A$, $ST_B$ do not pose an overflow/underflow problem as will be appreciated from FIGS. 14(a), 15(a). However, when the bit streams $ST_A$, $ST_B$ are spliced as illustrated in FIGS. 16(a), (b) at a splicing point $SP_V$ an overflow/underflow condition occurs. The overflow condition which is illustrated in FIGS. 17(a), (b) occurs when bit stream $ST_B$ continues to fill the VBV buffer to a point where the VBV buffer overflows as indicated at 141 in FIG. 17(a). The underflow case which is illustrated in FIGS. 18(a) and (b) occurs when stream $ST_B$ does not thereafter fill the VBV buffer by a sufficient amount thereby resulting in an underflow 142 shown in FIG. 18(b). In the decoding-side apparatus (IRD), either an overflow or underflow of the VBV buffer consequently results in a failure in decoding pictures on the decoding-side. It is not a typical to see the effects of overflow/underflow manifesting as the skipping, freezing or interruption of the images.

Heretofore, there has been no solution for providing a seamlessly-spliced bit stream from a plurality of bit streams without the serious defects illustrated in the foregoing examples.

OBJECTS AND SUMMARY OF THE INVENTION

It is therefore an object of the present invention to provide a system for splicing bit streams;

It is another object of the present invention to provide a system for seamlessly splicing bit streams;

It is another object of the present invention to prevent signal deterioration in a system for splicing bit streams;

It is another object of the present invention to prevent degradation of image quality due to improper reordering of the pictures in the spliced bit stream;

It is another object of the present invention to prevent picture distortion due to improper motion estimation and the propagation thereof;

It is another object of the present invention to prevent overflow/underflow in the video verifier buffer (VBV) buffer;

It is another object of the present invention to provide an editing system to generate seamless bit streams on the fly from video feeds of various sources for broadcast by a broadcasting station;

It is another object of the present invention to provide a system for splicing bit streams in a DVD system;

It is another object of the present invention to provide a system for generating interactive movies by splicing a plurality of bit streams representing various portions of the movie;

It is another object of the present invention to provide a video game system for generating interactive video game scenes selected in accordance with user commands by splicing a plurality of bit streams representing alternative user-directed scenes of a video game; and It is another object of the present invention to provide a system for encoding/decoding audio/video feeds spliced from a plurality of bit streams for on-line transmission.

According to the present invention, there is provided a system, method and apparatus for splicing a plurality of bit streams. The present invention inhibits a picture in the spliced bit stream which, upon decoding, would be out of sequence. In this manner, the present invention prevents an improper reordering of the spliced bit stream pictures on the decoding side.

In order to prevent deterioration in the image quality of the spliced bit stream, the present invention selectively reuses motion vector information fetched from the source coded streams for use in the re-encoding process. The new motion vectors are supplied to the motion compensation portion of the re-encoder in place of the original motion vectors. In order to prevent the improper prediction of a picture from an incorrect bit stream source, the present invention sets the direction of prediction to a picture which is positioned adjacent the splicing point thereby preventing degradation in image quality. In addition, the present invention has a capability of changing the picture type of a picture in the vicinity of the splicing point in order to prevent erroneous motion prediction from pictures from another bit stream source.

It is recognized in the present invention that the overflow/underflow condition occurs owing to an improper selection of the target bit rate for the spliced bit stream. So as to prevent overflow/underflow of the video buffer verifier (VBV) buffer, the target amount of bits is calculated anew for the spliced bit stream. The target amount of bits is calculated by reference to a quantizing characteristic produced in a previous coding process which may be retrieved from the source coded streams. In the alternative, the target amount is approximated. The plural bit streams are decoded in the region of the splicing point(s) and re-encoded in accordance with the new target bit rate.

With the present invention, seamlessly-spliced bit streams are provided without signal deterioration arising from improper reordering of the frames, picture distortion due to improper motion estimation or a breakdown in the video verifier (VBV) buffer due to improper selection of the target bit rate. It will be appreciated that the present invention is applicable to a wide range of applications including, for example, an editing system for generating seamless bit streams on the fly from video feeds of various sources for broadcast by a broadcasting station, a DVD system, a system for providing interactive movies, a video game system for generating alternative user-directed scenes of a video game or a system for encoding/decoding audio/video feeds for on-line transmission.

BRIEF DESCRIPTION OF THE DRAWINGS

FIGS. 11(a)–12(d) illustrate motion compensation crossover in the spliced bit stream;

DETAILED DESCRIPTION OF THE PREFERRED EMBODIMENTS

Figure 19:
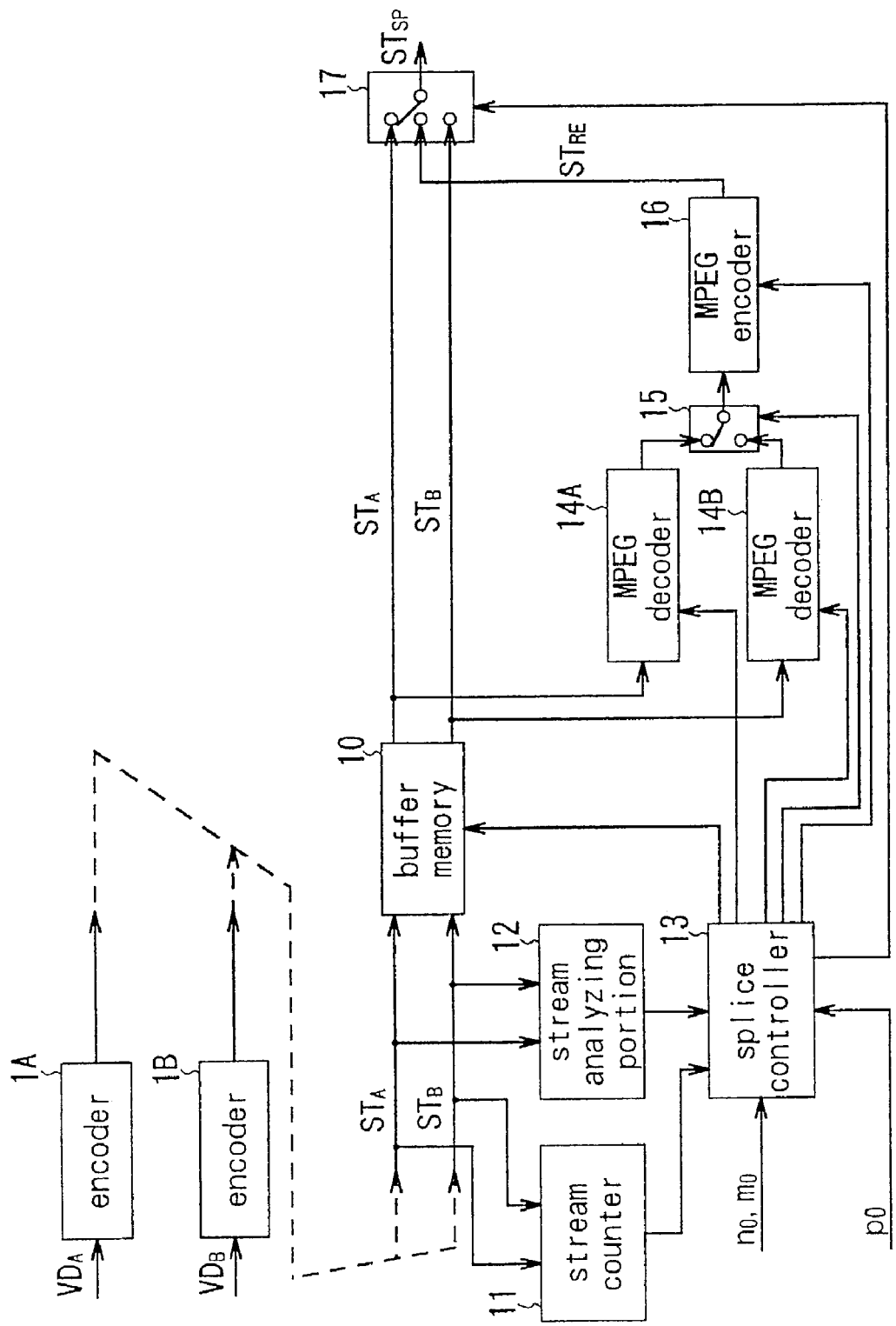
FIG. 19 illustrates the present invention.

FIG. 19 illustrates the present invention. It will be appreciated from the figure that the present invention receives a plurality of bit streams, in this case streams A and B ($ST_A$ and $ST_B$), which are selectively spliced in accordance with the bit splicing technique hereinafter described. The present invention is applicable to both the encoding and decoding sides and, as such, may optionally include encoders 1A and 1B for respectively encoding video data $VD_A$ and $VD_B$ which produce the bit streams $ST_A$ and $ST_B$. In any case, it is preferable that the output spliced bit stream $ST_{SP}$ of the present invention complies with the MPEG standard and is of course acceptable for any MPEG encoding/decoding system. It will be appreciated that the present invention is transparent to the end-viewer and, for that reason, is marketably attractive since the decoder may not need to be upgraded to receive the spliced bit streams of the present invention. The present invention is not limited to splicing one particular type of bit stream, but may of course be applied to any type of bit stream including, for example, the elementary stream, the packetized elementary stream and the transport stream.

In more detail, FIG. 19 illustrates that the streams $ST_A$ and $ST_B$ are input to a buffer memory 10, a stream counter 11 and a stream analyzing portion 12. The stream counter 11 counts the number of bits in each of the streams $ST_A$ and $ST_B$ whilst the stream analyzing portion 12 analyzes the syntax of each of the streams. A splice controller 13 controls the bit splicing operation of the present invention as will be described in more detail. MPEG decoders 14A and 14B decode the streams $ST_A$ and $ST_B$ retrieved from the buffer memory 10 which output respective base-band video data to a switch 15. At the control of the splice controller 13, the switch 15 outputs either stream $ST_A$ or $ST_B$ to an MPEG encoder 16.

The MPEG encoder 16, at the control of the splice controller 13, encodes the video base-band data selected by the switch 15 to thereby output a re-encoded bit stream $ST_{RE}$. A switch 17, as controlled by the splice controller 13, selectively outputs either the bit streams $ST_A$, $ST_B$ retrieved from the buffer memory 10 or the re-encoded bit stream $ST_{RE}$ to thereby output the spliced bit stream $ST_{SP}$.

The operation of the present invention shown in FIG. 19 will now be described. The stream counter 11 counts the number of bits of each of the received streams $ST_A$ and $ST_B$ and supplies the count value to the splice controller 13. The number of bits of the streams is counted because the locus of the data occupancy of the video buffer verifier needs to be controlled to prevent overflow/underflow. The stream analyzing portion 12 analyzes the syntax of each of the streams to fetch appropriate information from the layers of the bit streams including the sequence layer, the GOP layer, the picture layer and the macroblock layer. For example, encoded information such as the picture type (I, B or P), motion vectors, quantizing steps and quantizing matrices are retrieved by the stream analyzing portion.

The splice controller 13, based on the count value from the stream counter 11 and the information from the stream analyzing portion 12, sets a re-encoding range for each bit stream in accordance with the range parameters $n_0$ and $m_0$. Likewise, the splicing point(s) are set in accordance with the splice point parameter $p_0$(s). The splice controller 13 controls the timing of the switch 15 to select the appropriate bit stream $ST_A$ or $ST_B$ to be sent to the MPEG encoder 16 in accordance with the splicing point parameter $p_0$ and the range parameters $n_0$, $m_0$. The phase and timing of the bit streams are controlled by the splice controller to coincide at the predetermined splicing point(s). The splice controller 13 controls the switch 17 to select the bit streams $ST_A$ and $ST_B$ normally. The re-encoded bit stream $ST_{RE}$ produced by the MPEG encoder 16 is selected during the re-encoding range in accordance with the parameters $n_0$, $m_0$ and $p_0$.

Figure 20:
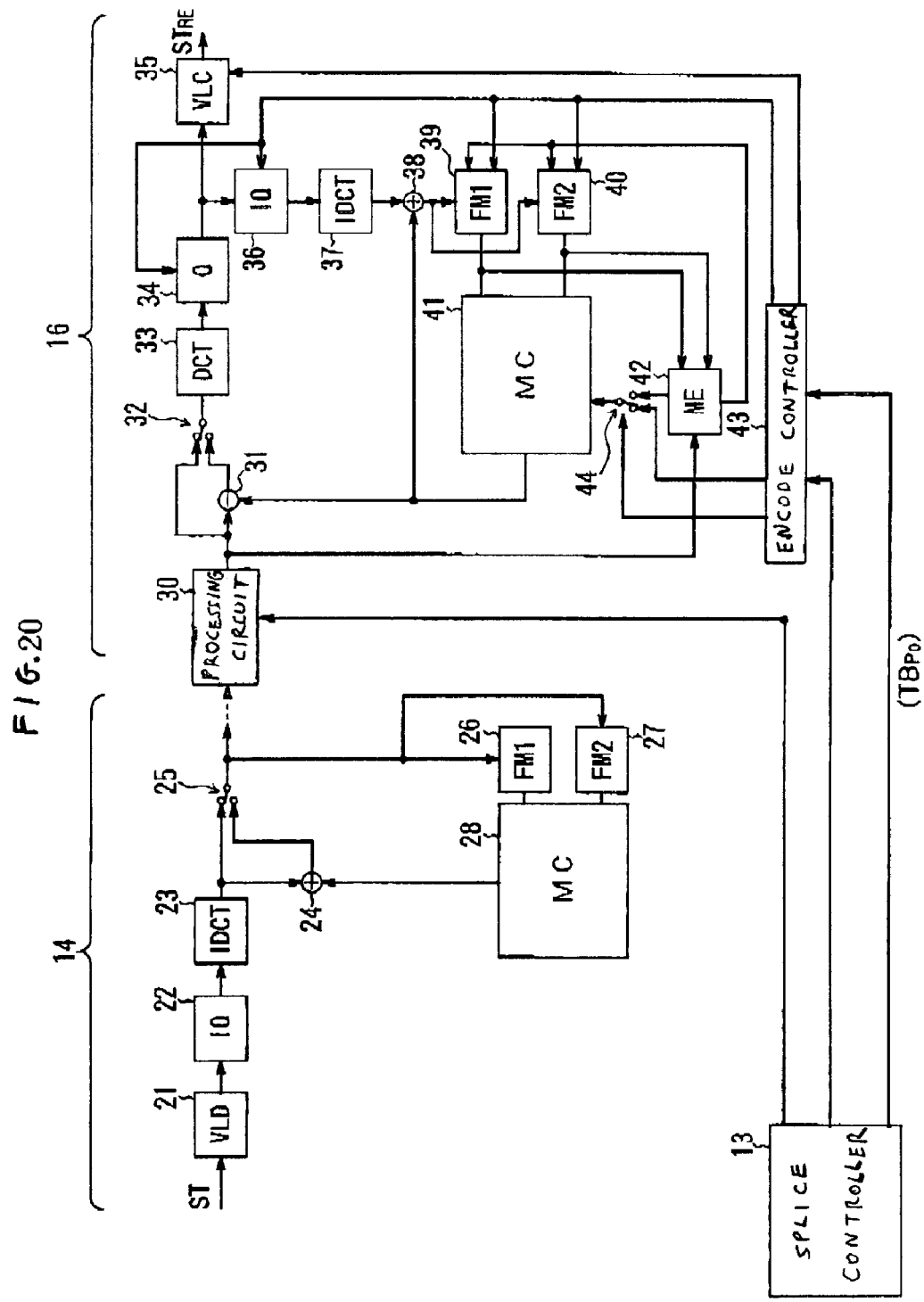
FIG. 20 illustrates the block diagram of the encoder and decoder of FIG. 19.

FIG. 20 illustrates in more detail the MPEG decoding/encoding section of the present invention wherein reference numeral 14 generally indicates the MPEG decoders 14A, B and reference numeral 16 generally indicates the MPEG encoder 16 shown in the previous figure. The decoding section 14 of the figure essentially performs MPEG decoding utilizing a decompression section for decompressing the input stream ST including a variable-length decoding circuit (VLD) 21, an inverse quantization circuit (IQ) 22 and an inverse discrete cosine transform circuit (IDCT) 23. The motion estimation section of the decoding section 14 includes an addition circuit 24 for adding the decompressed bit-stream motion prediction coefficients to the motion estimation coefficients produced in the motion estimation section of the decoder. A switch 25 alternates between selecting the decompressed data corresponding to the I-frames, which bypass motion estimation, and the motion estimated data output from the addition circuit 24. The motion estimation section performs motion estimation utilizing frame memories (FM1, FM2) 26, 27 and a motion compensation section (MC) in accordance with the operation described with reference to FIGS. 6(a)–(d).

The encoding section 16 shown in FIG. 20 encodes the decoded video data output from the MPEG decoders 14A and 14B in accordance with the operations of the splice controller 13. An encoder's previous processing circuit 30 preprocesses the decoded video data by rearranging the pictures of the decoded-video date in accordance with the bidirectional predictive-coding process, forms pixel macroblocks and calculates the difficulty in coding each picture.

In the preferred embodiment, the encoder's previous processing circuit 30 forms 16×16 pixel macroblocks. The encoding section 16 further incorporates a subtraction circuit 31 for subtracting a motion prediction error from the input decoded video data, a switch 32 for bypassing the motion-compensated prediction process in the case of I-frames and a compression/motion-compensated prediction section. The compression portion includes a discrete cosine transform circuit (DCT) 33, a quantizing circuit (Q) 34 and a variable-length coding circuit (VLC) 35. The quantizing circuit 34 of the present invention is controlled by the splice controller 13.

The motion-compensated prediction portion predicts the motion within the B- and P-frames of the input decoded video data. In more detail, the compressed bit stream is decompressed by application to an inverse quantizing circuit (IQ) 36 followed by an inverse discrete cosine transform circuit (IDCT) 37. The decompressed bit stream is added by the addition circuit 38 to the motion-compensated version of the picture in order to reconstitute the current frame. The frame memories FM1, FM2 (39, 40) store the appropriate reconstructed frames at the control of the motion detection circuit 42 in accordance with the type of predictive coding (B- or P-frame encoding). The motion compensation circuit 41 performs motion compensation in accordance with the frame(s) stored in the frame memories (FM1, FM2) 39, 40 based on the motion vectors provided by the motion detection circuit 42. The motion compensated picture, which is essentially a prediction of the current frame, is subtracted from the actual current frame by the subtraction circuit 31. It will be appreciated that the output of the subtraction circuit 31 is essentially an error result representing the difference between the actual frame and the prediction. An encode controller 43 provides substitute motion vectors and controls a switch 44 in order to select between the motion vectors determined by the motion detection circuit 42 and the substitute motion vectors.

The operation of the decoding/encoding section shown in FIG. 20 will now be described. The decoding section 14 decodes the input stream ST preferably in accordance with the MPEG standard. The encoder's previous processing circuit 30 rearranges the pictures for encoding in accordance with the picture type information extracted by the stream analyzing circuit 12 and forms picture data into macroblocks. The rearranged pictures are forwarded to the encoding section 16 of the figure for encoding.

The splice controller 13 forwards the encoded information, more particularly the motion vectors, which are extracted by the stream analyzing circuit to the encode controller 43. When it is determined to reuse the substitute motion vectors, the encode controller 43 causes the switch 44 to select the motion vectors supplied thereto. At other times, the encode controller 43 causes the switch 44 to select the motion vectors produced by the motion detection circuit 42. The encode controller 43 controls the frame memories (FM1, FM2) 39, 40 to store the appropriate pictures required to produce the predictive image data based on the substitute motion vectors and in accordance with the picture type of the current picture to be encoded. In addition, the encode controller 43 controls the quantization step size of the quantizing circuit 34 and the inverse quantization circuit 36 to accommodate the motion vectors in accordance with the target bit rate supplied by the splice controller 13.

The encode controller 43, moreover, controls the variable-length coding circuit 35. When it is determined that an amount of generated bits of the variable-length coding circuit 35 is insufficiently large with respect to the target amount of bits supplied by the splice controller 13, which forewarns of an underflow in the VBV buffer, the encode controller 43 adds dummy data to the variable-length coding circuit 35 in order to account for the shortage with respect to the target amount of bits. Conversely, the encode controller 43 performs a skipped macroblock process (ISO/IEC 13818-27.6.6) which interrupts the coding process in terms of macroblock units when it is determined that the variable-length coding circuit 35 generates an amount of bits that is relatively larger than the target amount of bits which warns of an overflow.

Figure 21:
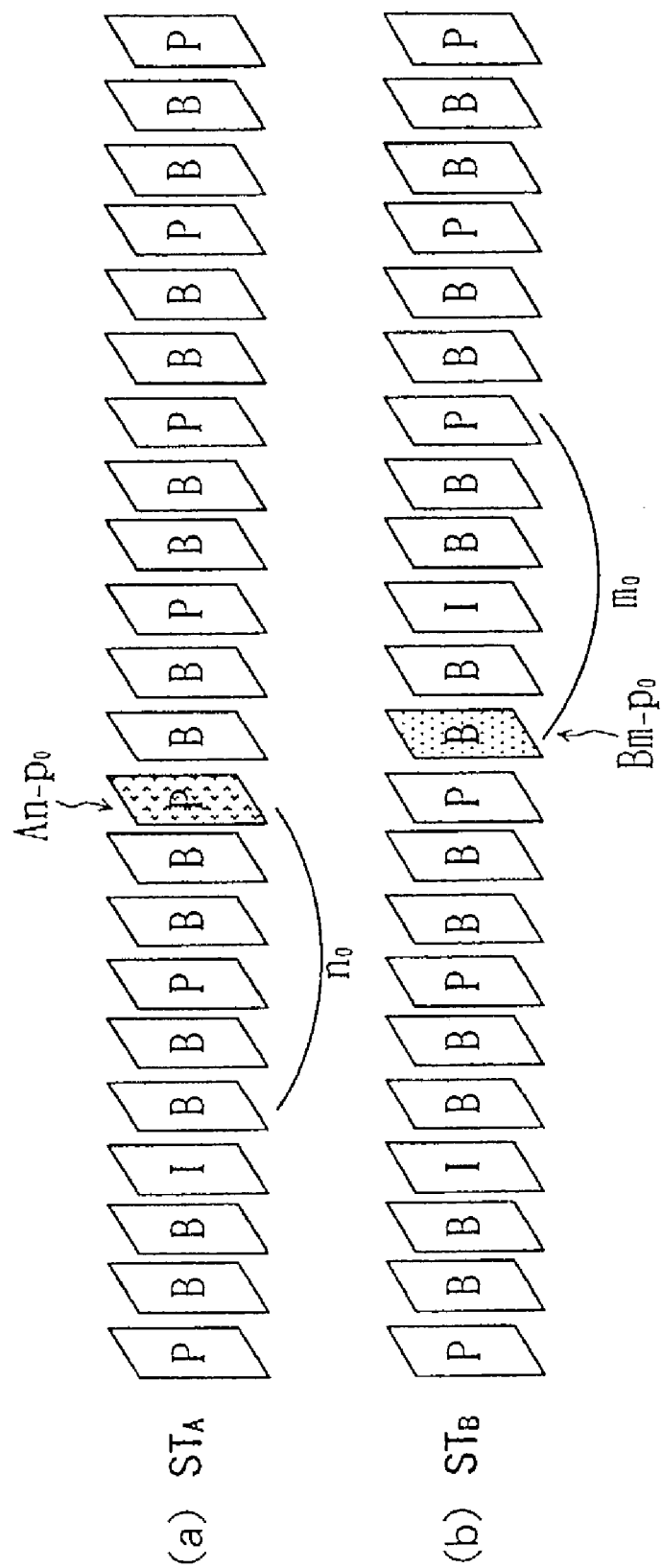
FIGS. 21(a), (b) illustrate the re-encoding operation of the present invention.
Figure 22:
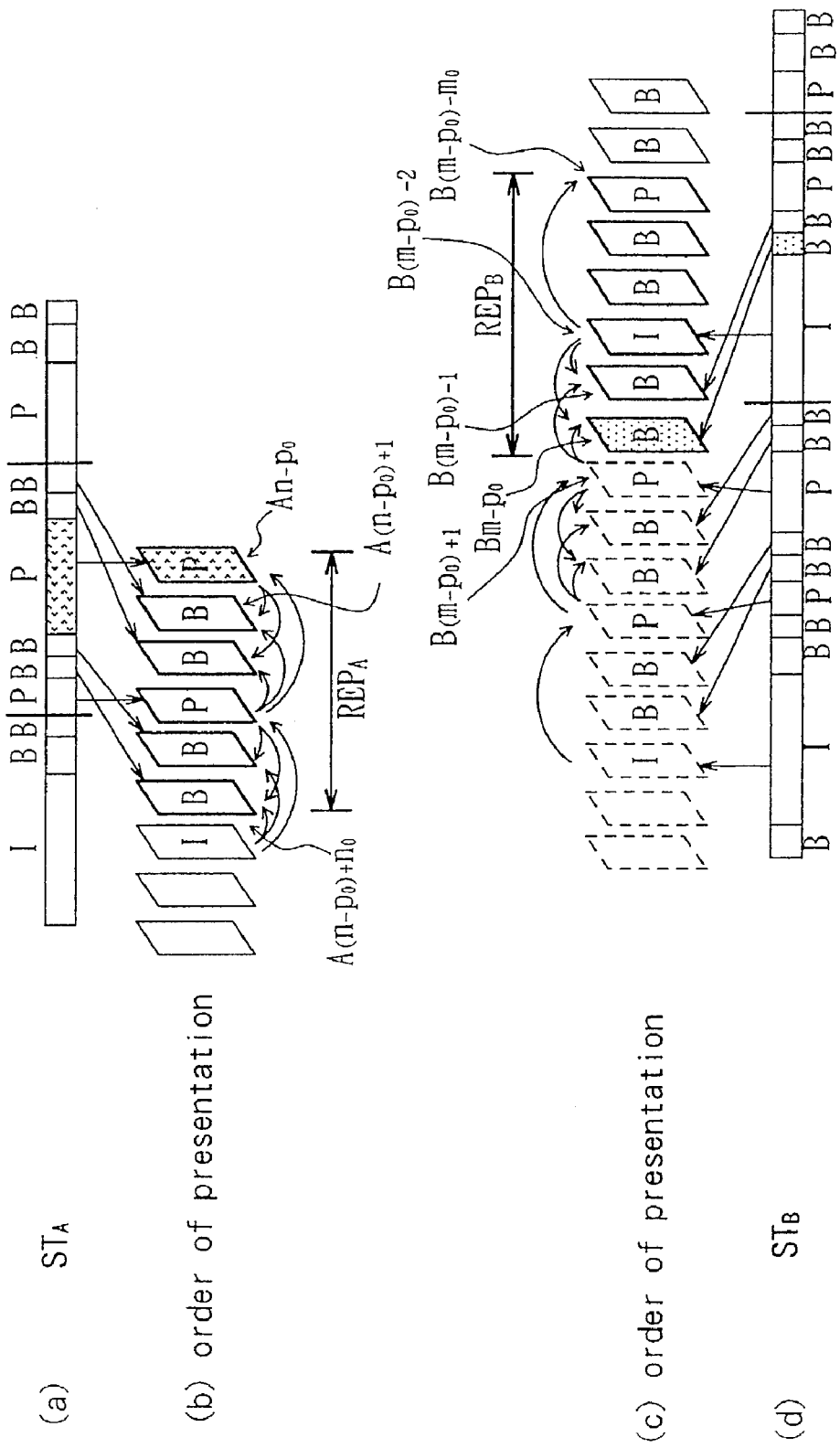
FIGS. 22(a)–(d) illustrate the operation of decoding the bit streams according to the present invention.
Figure 23:
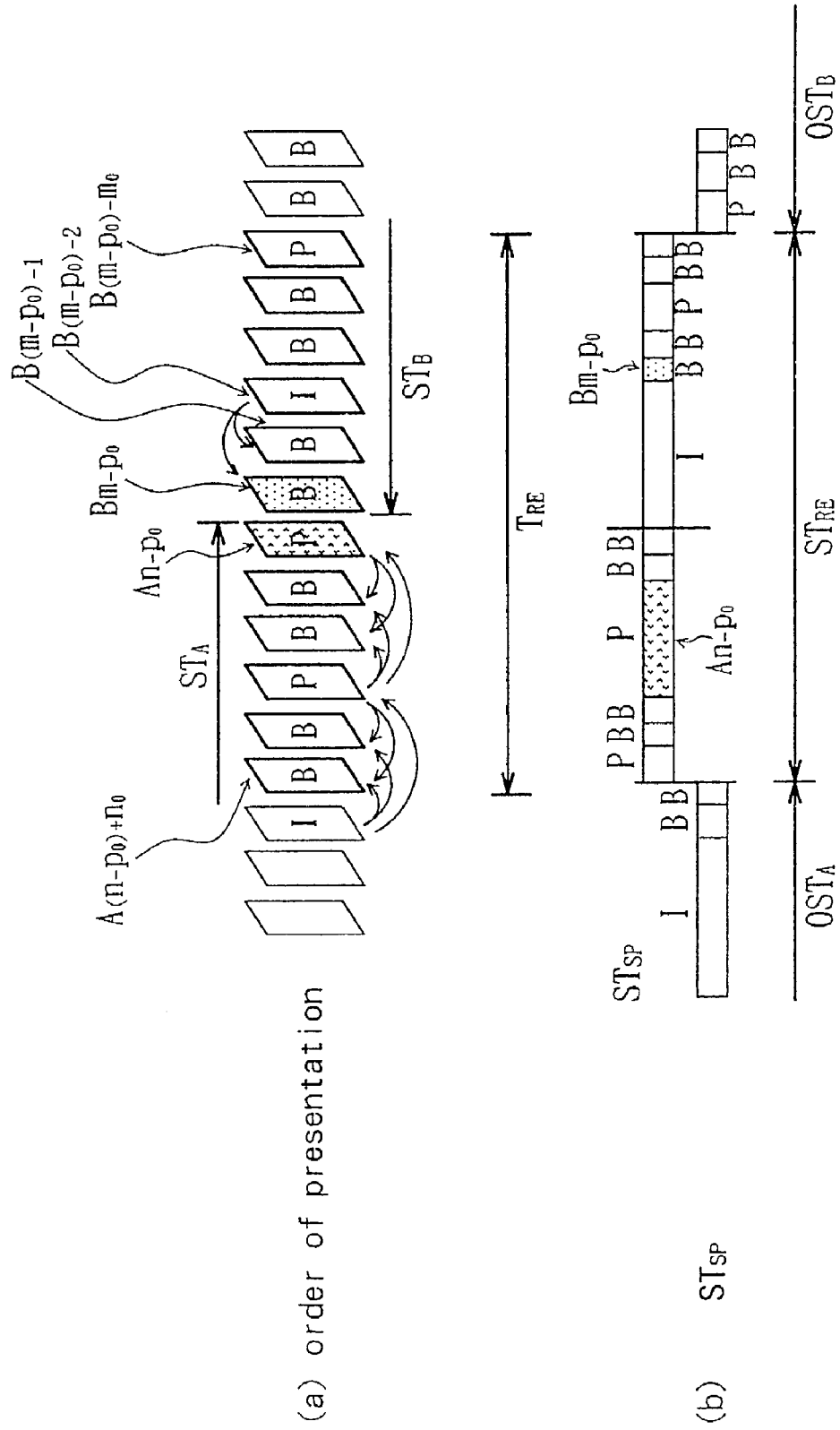
FIGS. 23(a), (b) illustrate the splicing operation of the present invention.
Figure 24:
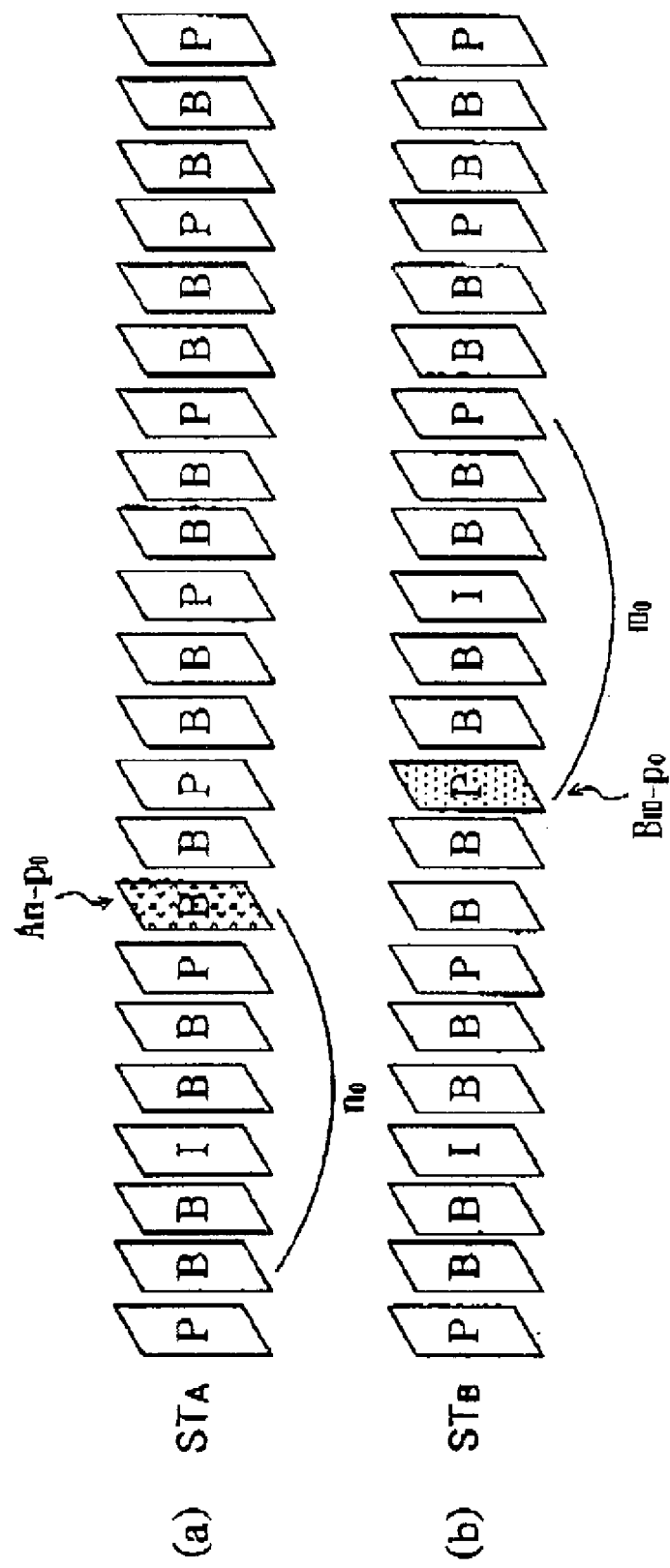
FIGS. 24(a), (b) illustrate streams $ST_A$, $ST_B$ for splicing in accordance with the present invention.
Figure 25:
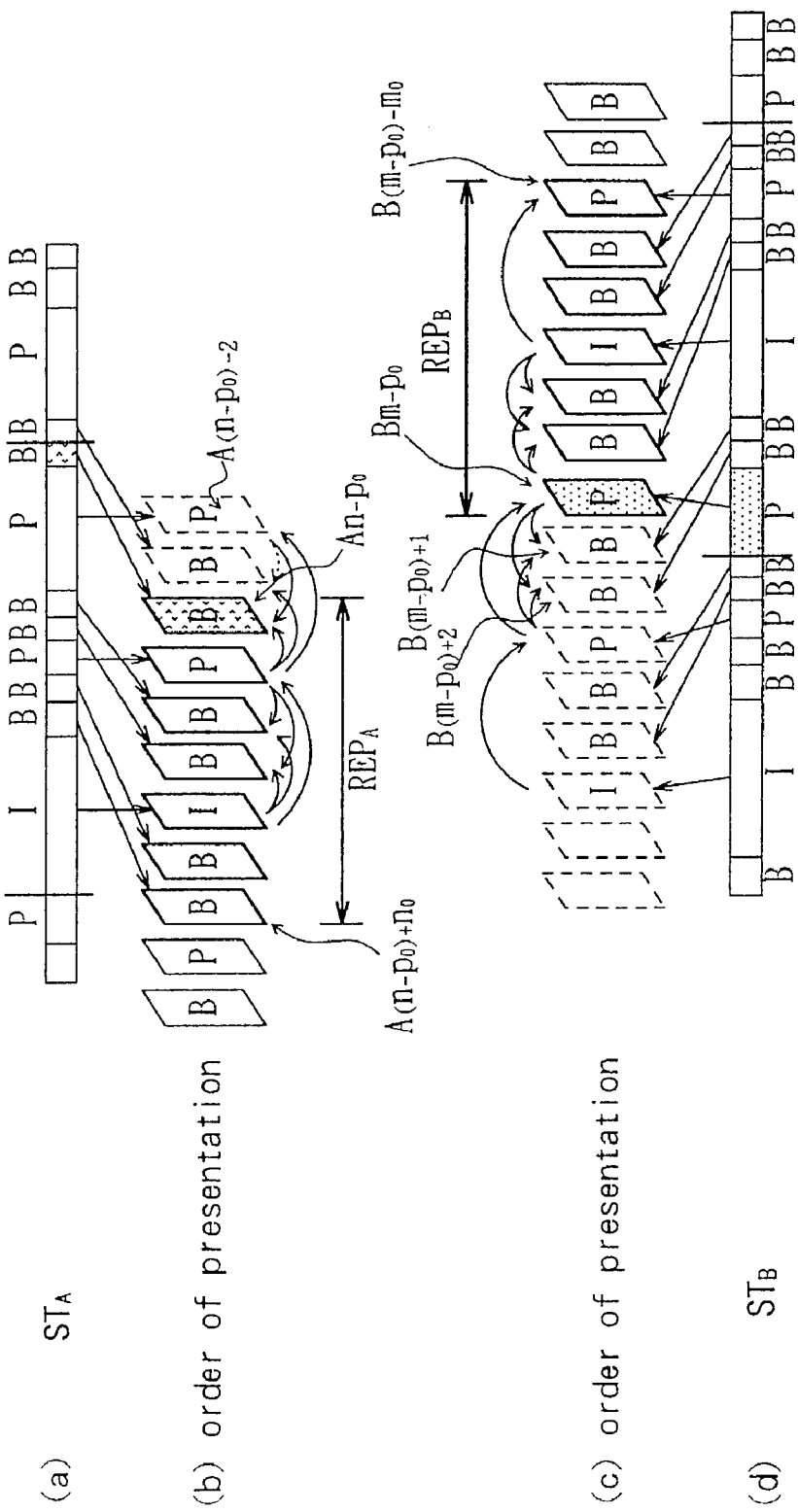
FIGS. 25(a)–(d) illustrate the decoding operation in accordance with the present invention.
Figure 26:
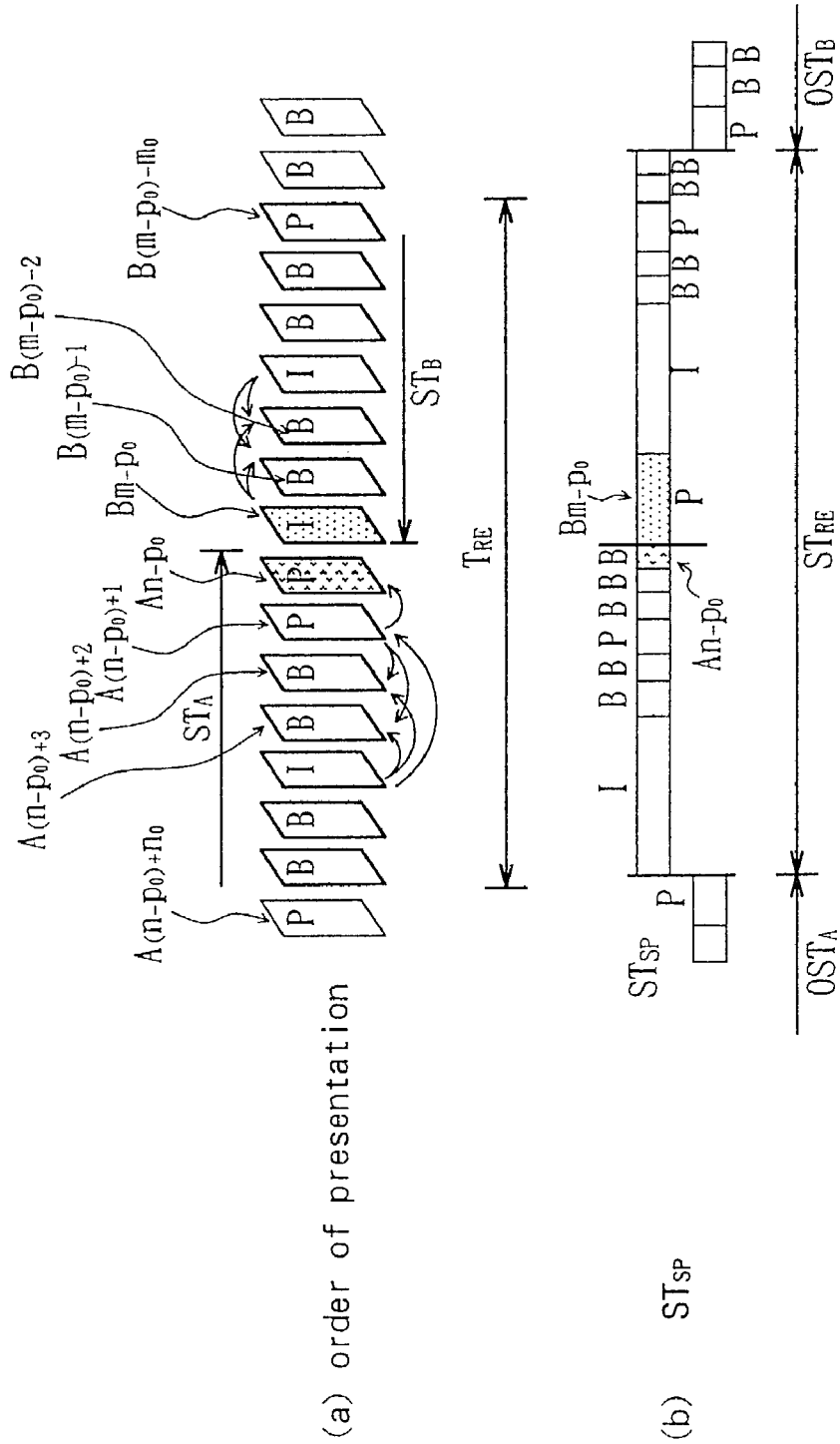
FIGS. 26(a), (b) illustrate the spliced bit stream in accordance with the present invention.
Figure 27:
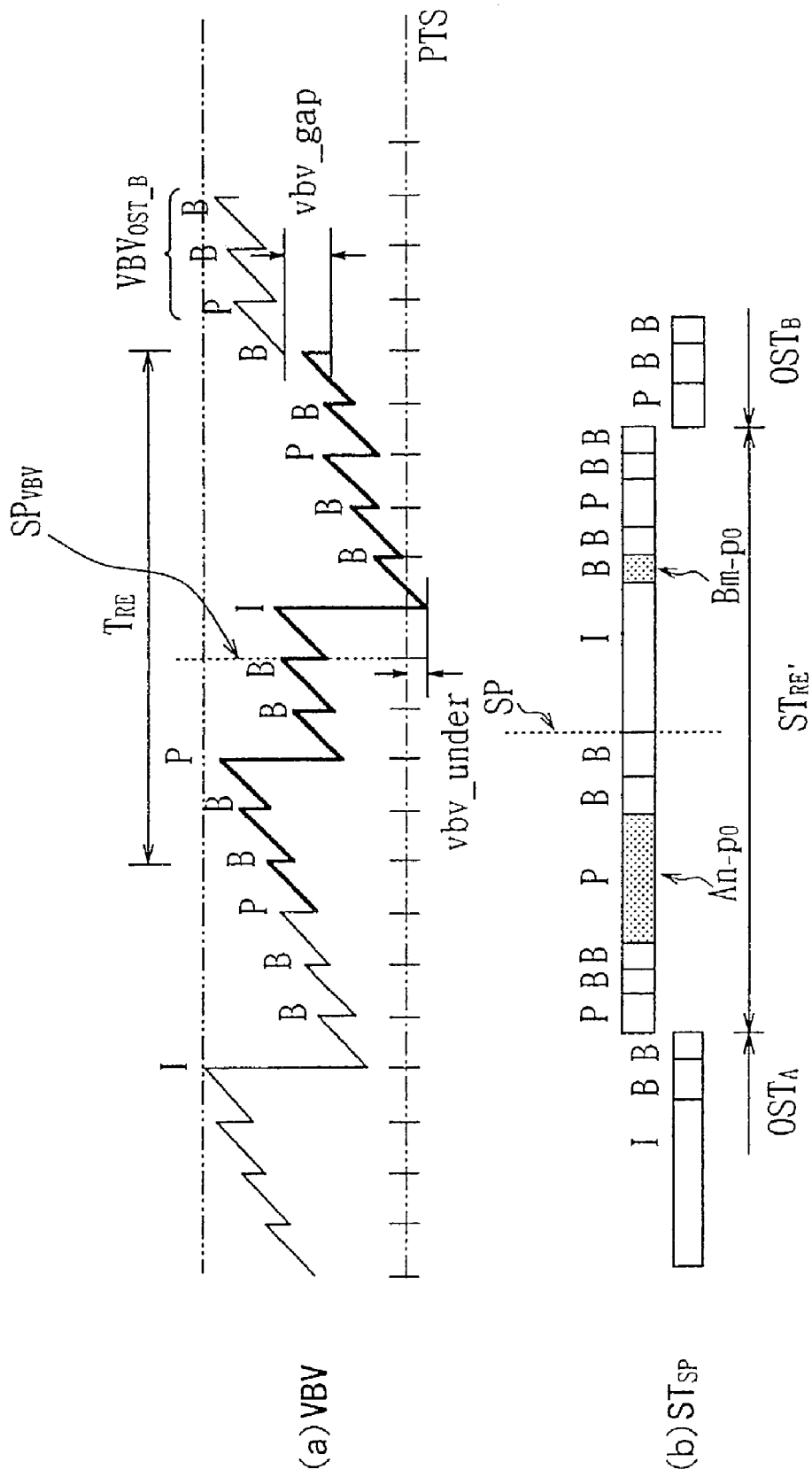
FIGS. 27(a), (b) illustrate an underflow of the video buffer verifier.
Figure 28:
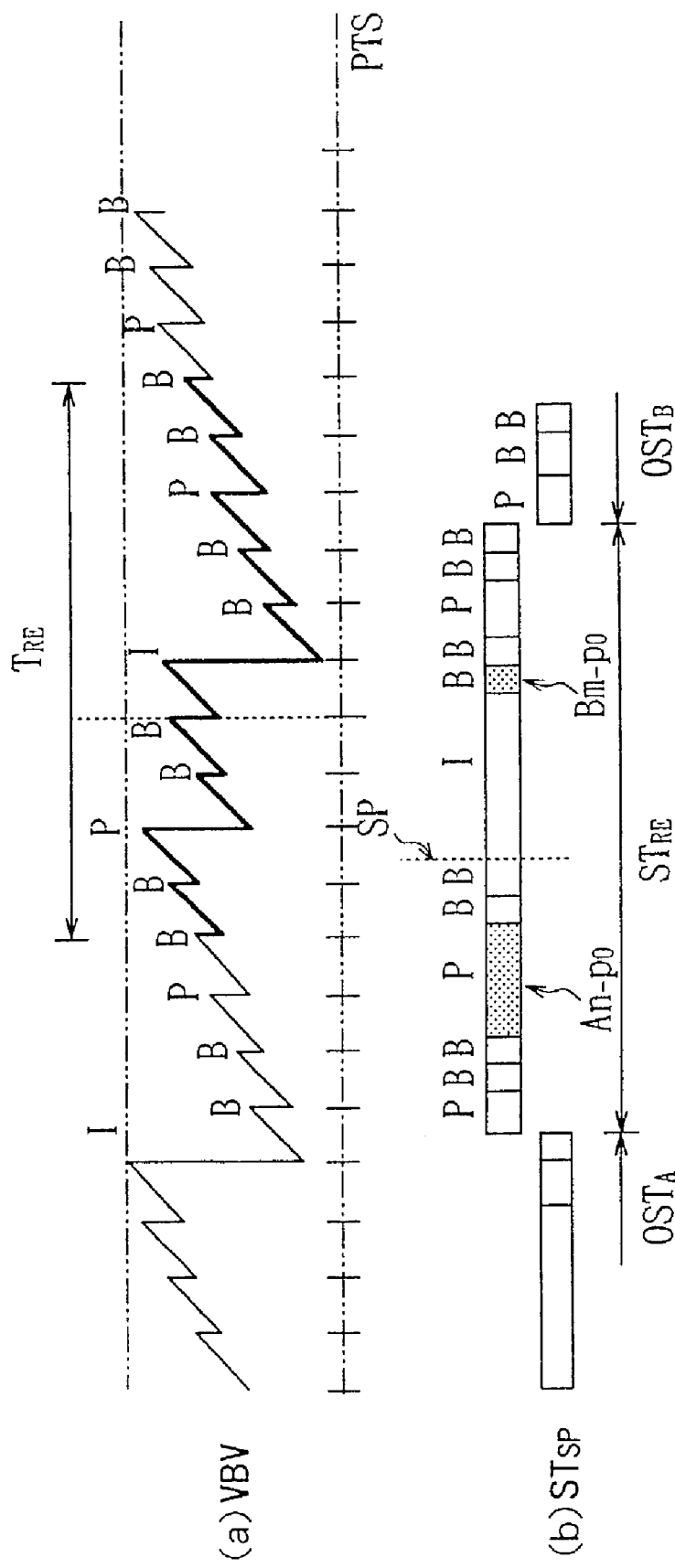
FIGS. 28(a), (b) illustrate the prevention of underflow in accordance with the present invention.
Figure 29:
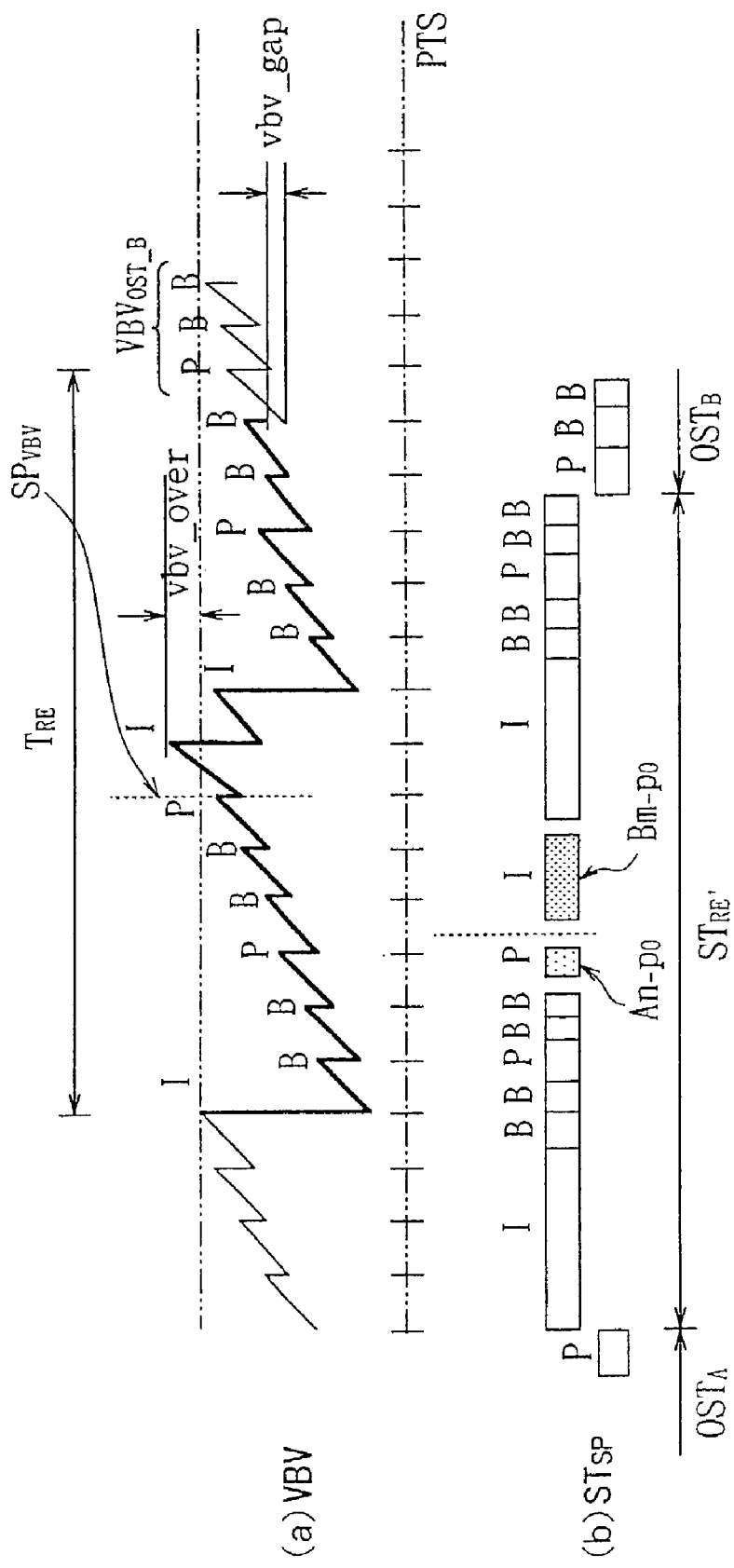
FIGS. 29(a), (b) illustrate an overflow of the video buffer verifier.
Figure 30:
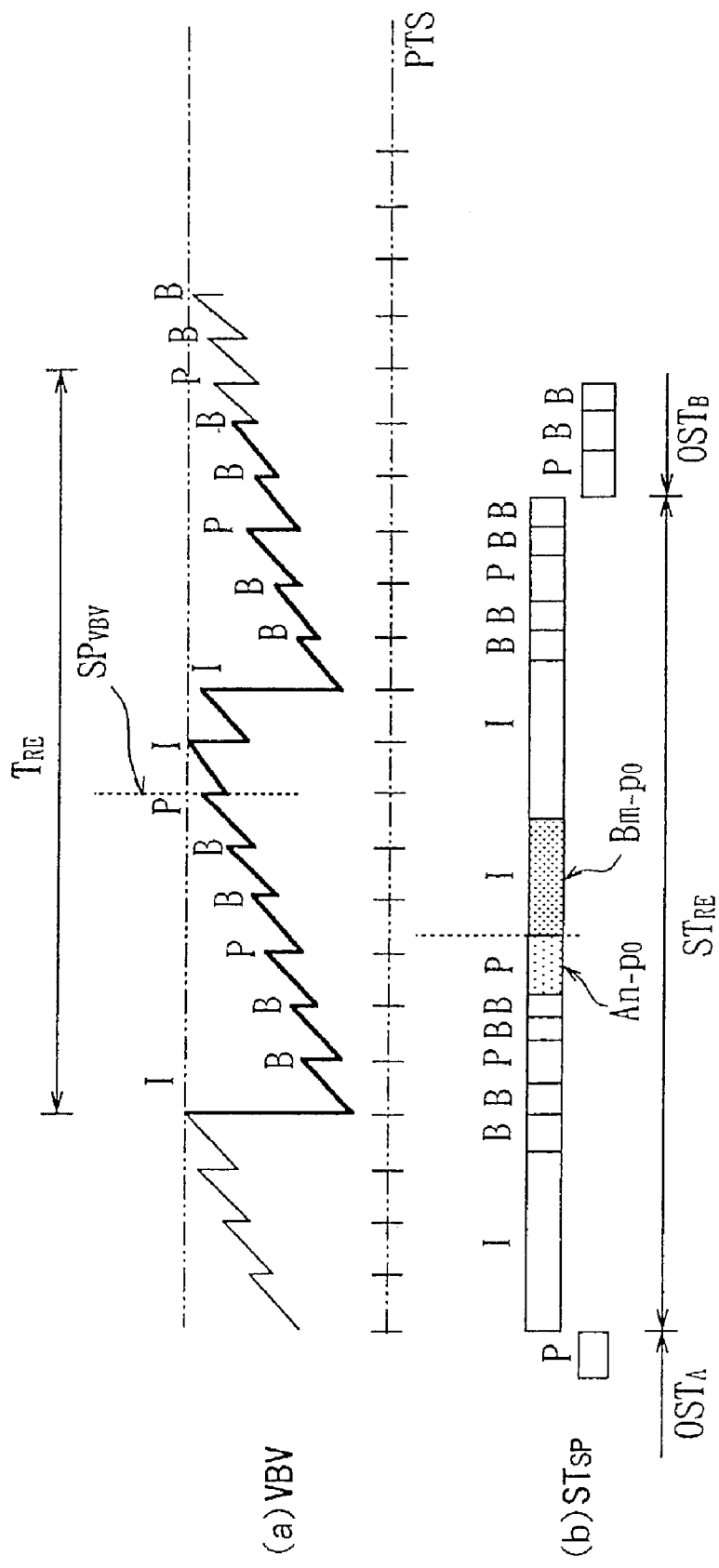
FIGS. 30(a), (b) illustrate the prevention of overflow in accordance with the present invention.

An example of the control of the decoding/encoding section according to the present invention will now be described with reference to FIGS. 21(a) to 26(b). FIGS. 21(a), (b) illustrate the process of selecting the video data to be re-encoded (also referred to as "presentation video data") representing those portions of the bit streams $ST_A$ (FIG. 21(a)) and $ST_B$ (FIG. 21(b)) decoded respectively by the decoders 14A and 14B. In summary, when the splicing point as determined by the parameter $p_0$ is set, the pictures comprising the presentation video data are selected to include those pictures within the re-encoding ranges as defined by the parameters $n_0$ and $m_0$.

A picture at the splicing point corresponding to stream $ST_A$ is expressed as $A_{n-P0}$, wherein n is an integer and $p_0$ is the splicing point parameter. Following this convention, pictures which are future to the picture at the splicing point are expressed as $A_{(n-P0)+1}$, $A_{(n-P0)+2}$, $A_{(n-P0)+3}$, $A_{(n-P0)+4} \ldots A_{(n-P0)+n0}$, wherein $n_o$ is the range parameter defining the range of the presentation video data corresponding to bit stream $ST_A$. Conversely, pictures more previous than the picture $A_{n-P0}$ at the splicing point are expressed as $A_{(n-P0)-1}$, $A_{(n-P0)-2}$, $A_{(n-P0)-3}$, $A_{(n-P0)-4}$, and so on. Likewise, the presentation video data corresponding to the stream $ST_B$ at the splicing point is expressed as $B_{(m-P0)}$ and the pictures in the re-encoding range defined by the parameter $m_0$ are expressed as $B_{(m-P0)+1}$, $B_{(m-P0)+2}$, $B_{(m-P0)+3}$, $B_{(m-P0)+4} \ldots B_{(m-P0)-1}$, $B_{P0)-3}$, $B_{(m-P0)-4} \ldots B_{(m-P0)-m0}$. As illustrated in FIGS. 21(a) and (b), the range of pictures in each respective bit stream $ST_A$, $ST_B$ are indicated by the ranges for re-encoding ($n_0$, $m_0$). In other words, the re-encoding ranges include the pictures from picture $A_{(n-P0)+n0}$ to picture $A_{(n-P0)}$ and pictures from picture $B_{(m-P0)}$ to picture $B_{(m-P0)-m0}$.

With the present invention, the problem that the decoder on the decoding-side presents the pictures in the improper order is prevented. Each decoder 14A, B respectively decodes stream $ST_A$, $ST_B$ thereby providing the decoded pictures A and B shown in FIGS. 22(b), (c). The splice controller 13 selects the re-encoding pictures $REP_A$, $REP_B$ from pictures A, B by operation of switch 15. Since the streams $ST_A$, $ST_B$ are decoded by two separate decoders, each set of pictures A, B are not cross-referenced and, therefore, not reordered upon decoding. In other words, the pictures which are incorrectly inserted into the wrong stream upon decoding are excluded by the splice controller 13. As shown in FIGS. 25(c), (d), for example, the B-pictures $B_{(m-P0)+2}$, $B_{(m-P0)+1}$ are excluded from the decoded pictures. Thus, the present invention provides a seamlessly-spliced stream which, upon decoding by the decoding-side decoder, arranges the pictures in the correct order of presentation as shown in FIG. 23(a).

Figure 1:
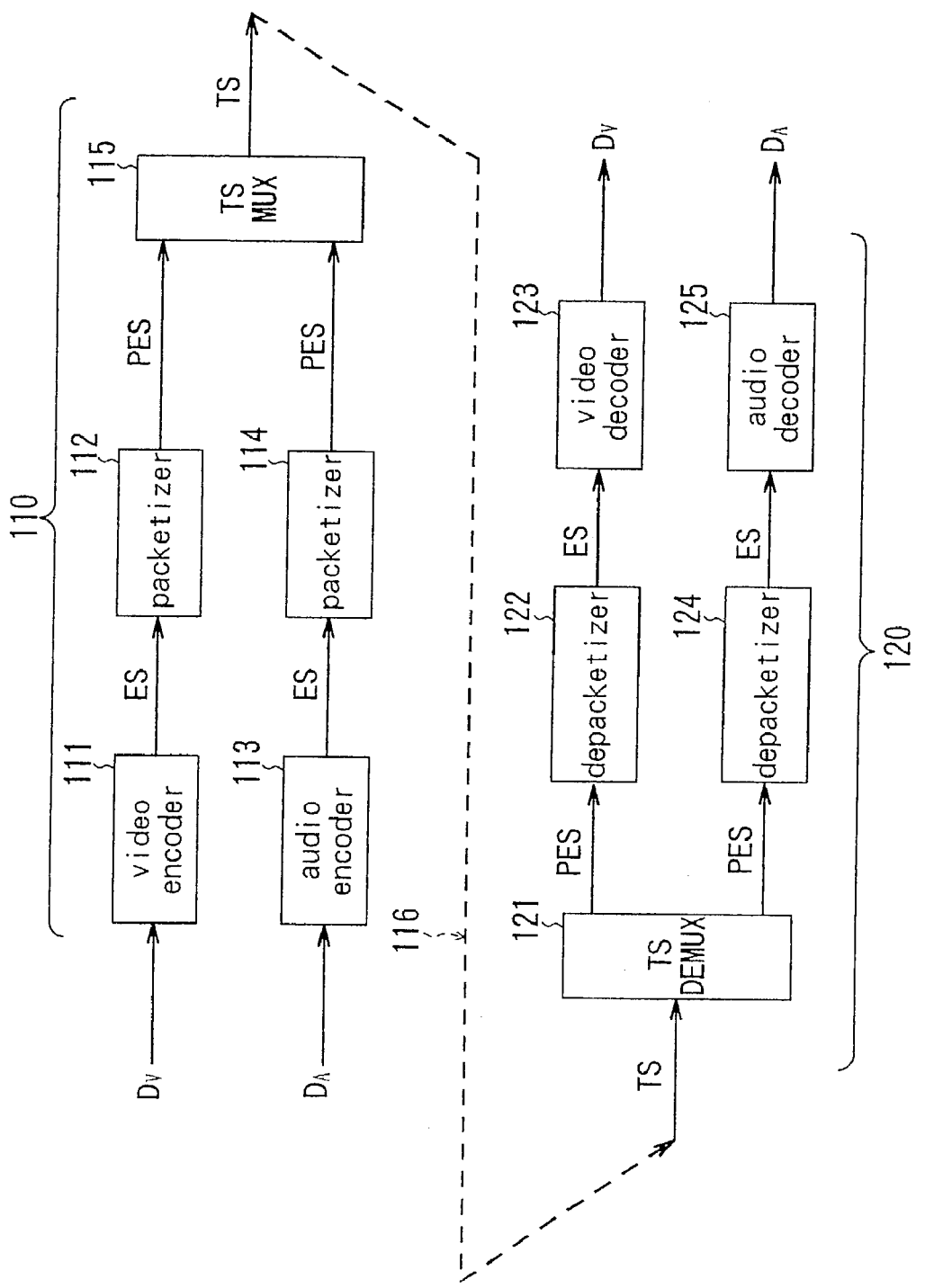
FIG. 1 is a block diagram of a recording/reproducing system.
Figure 2:
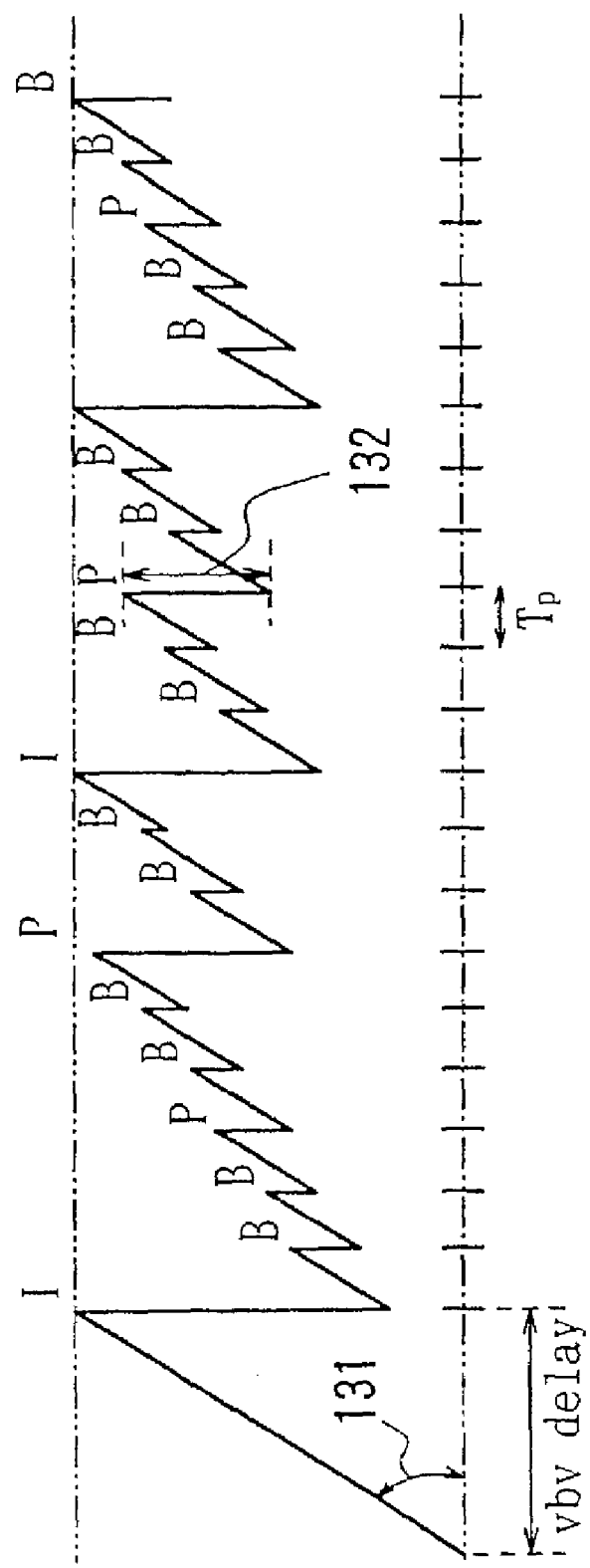
FIG. 2 illustrates the operation of a VBV buffer.
Figure 3:
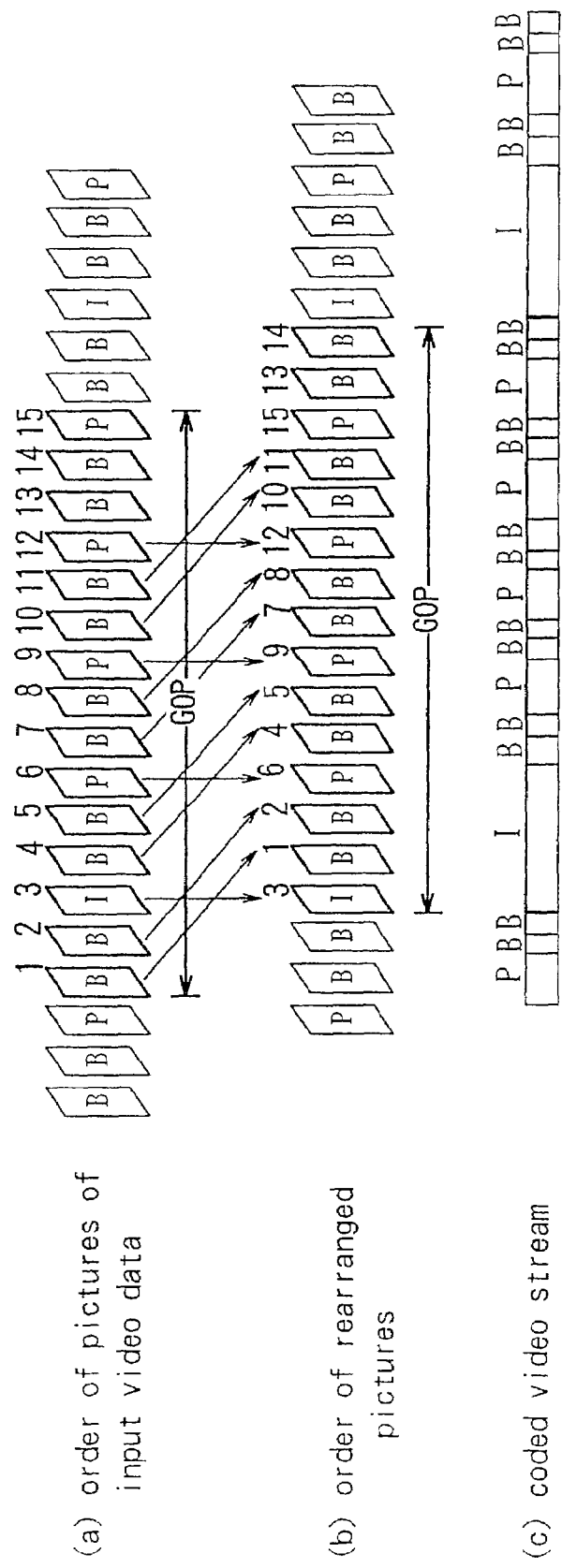
FIGS. 3(a)–(c) illustrate the operation of an encoder.
Figure 4:
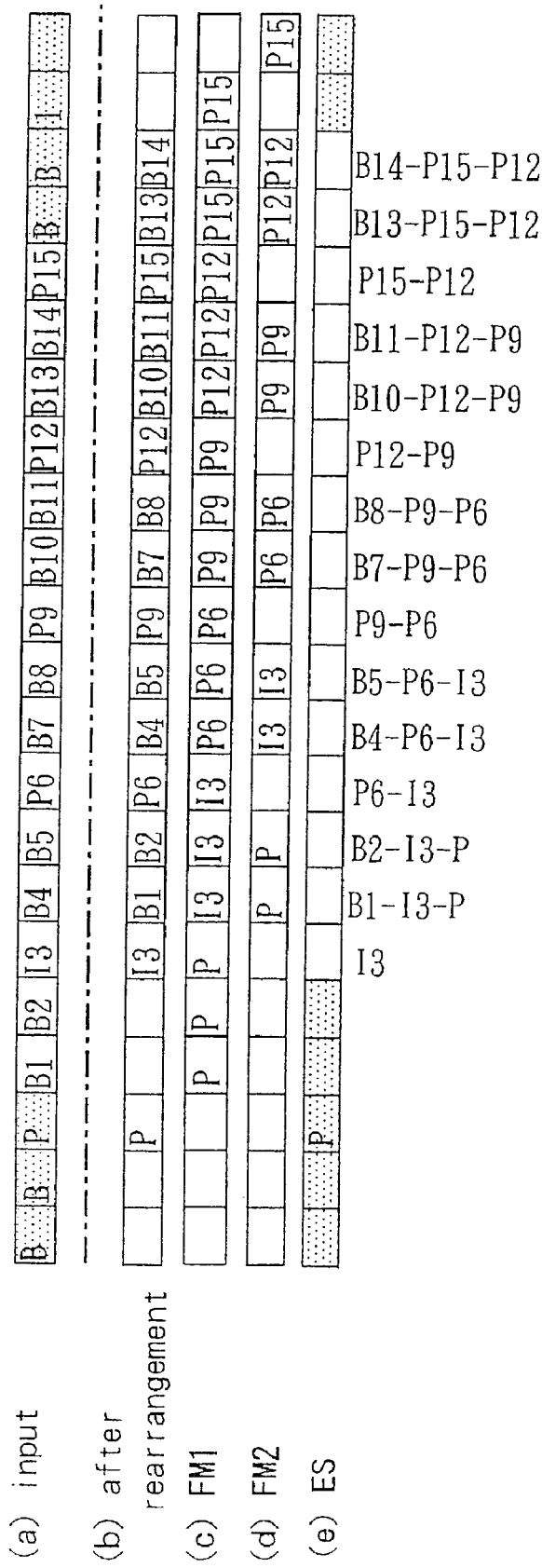
FIGS. 4(a)–(e) illustrate the operation of the frame memories of the encoder.
Figure 5:
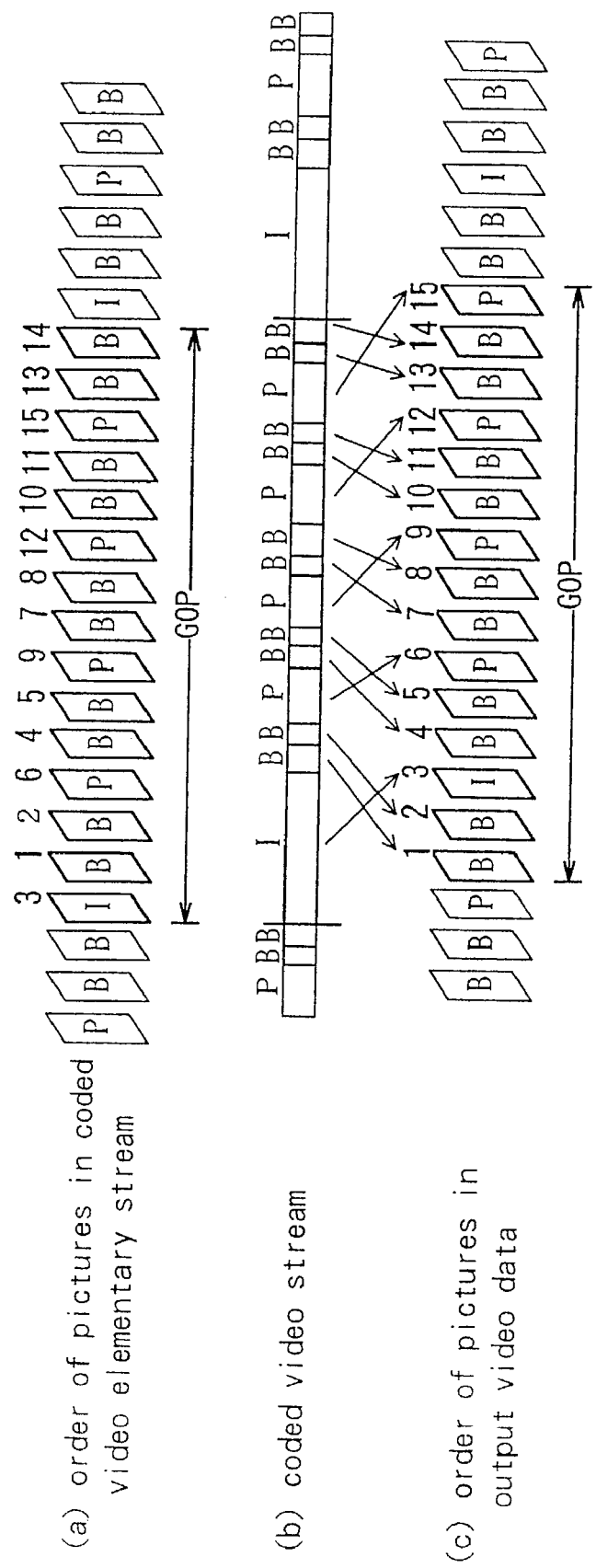
FIGS. 5(a)–(c) illustrate the operation of a decoder.
Figure 6:
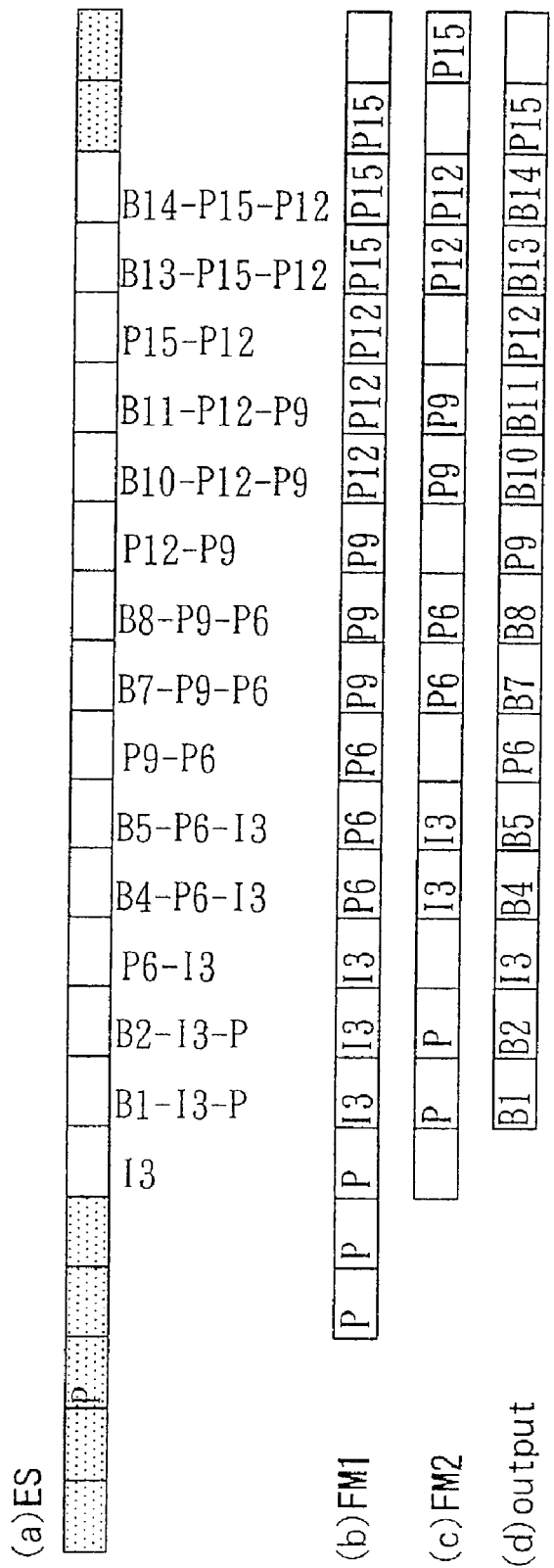
FIGS. 6(a)–(d) illustrate the operation of the frame memories of the decoder.
Figure 7:
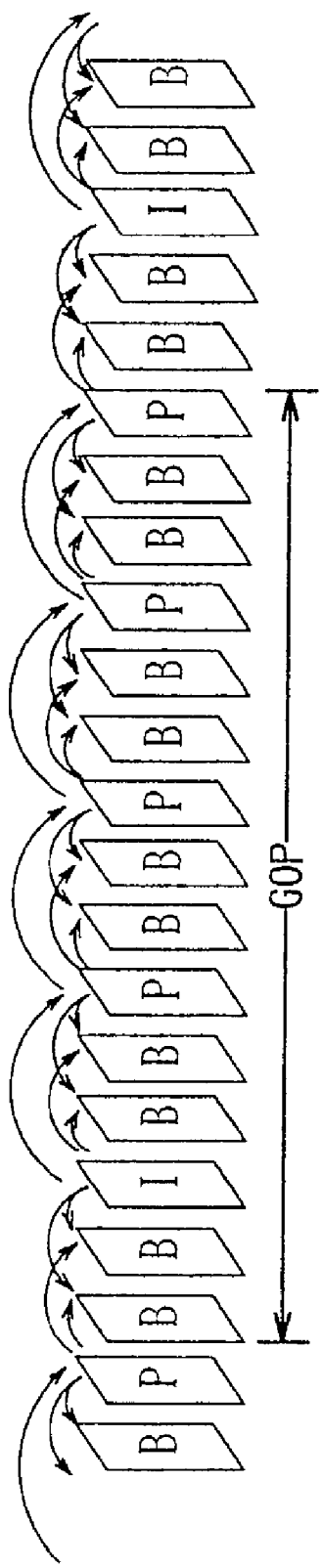
FIG. 7 illustrates the prediction direction for encoding/decoding.
Figure 8:
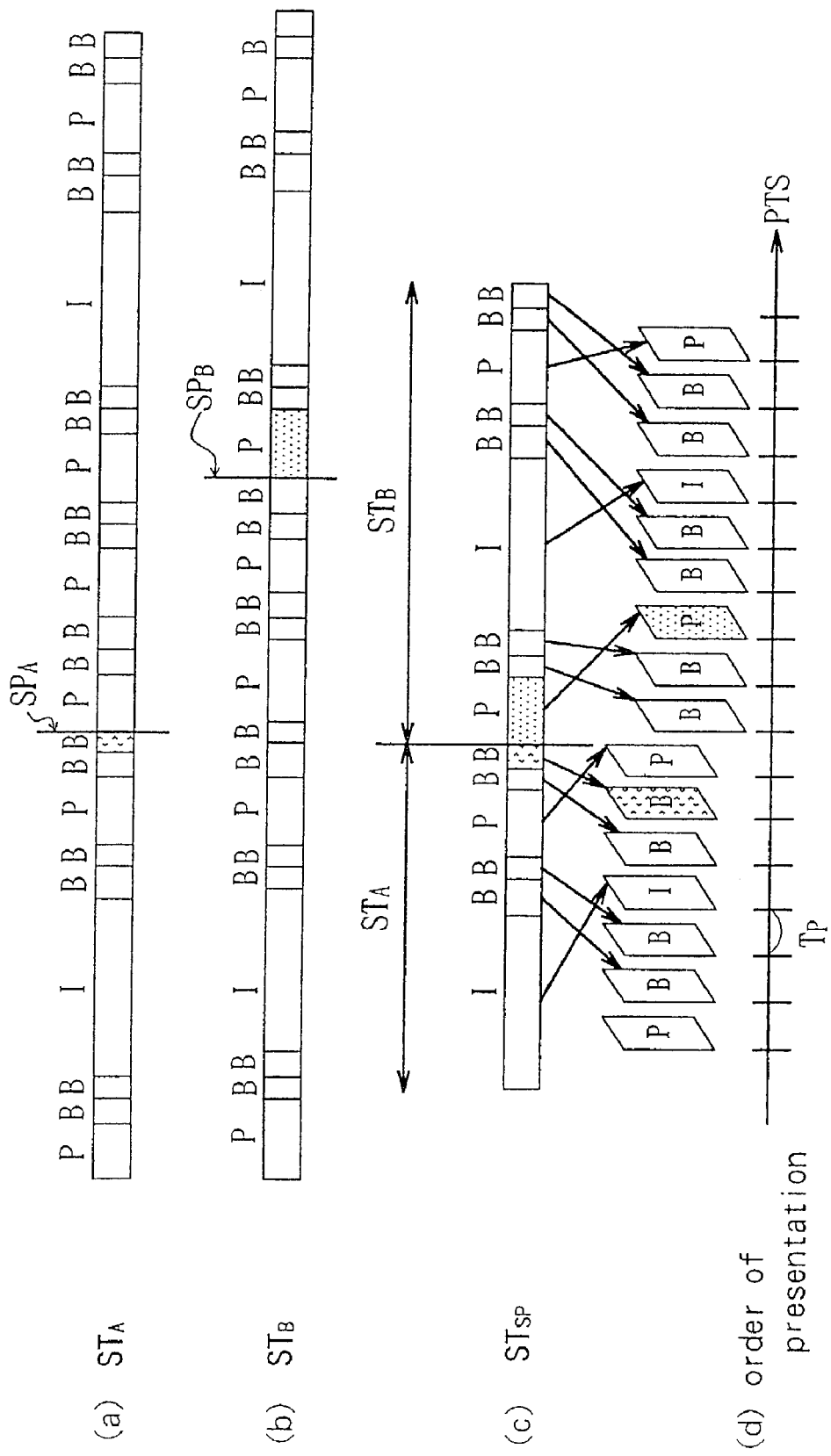
FIGS. 8(a)–(d) illustrate the bit splicing operation.
Figure 9:
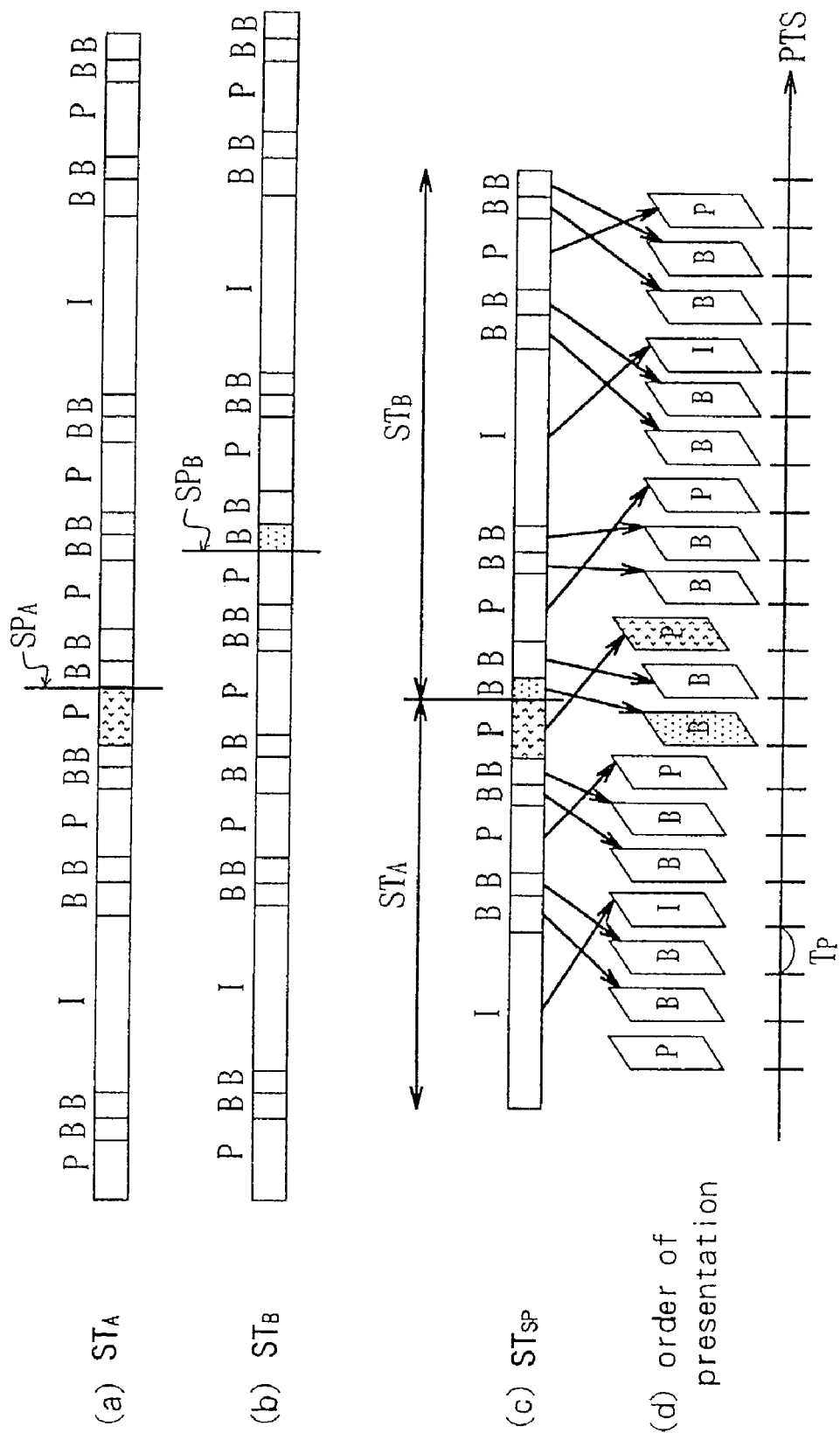
FIGS. 9(a)–(d) illustrate the reordering of the spliced bit stream.
Figure 10:
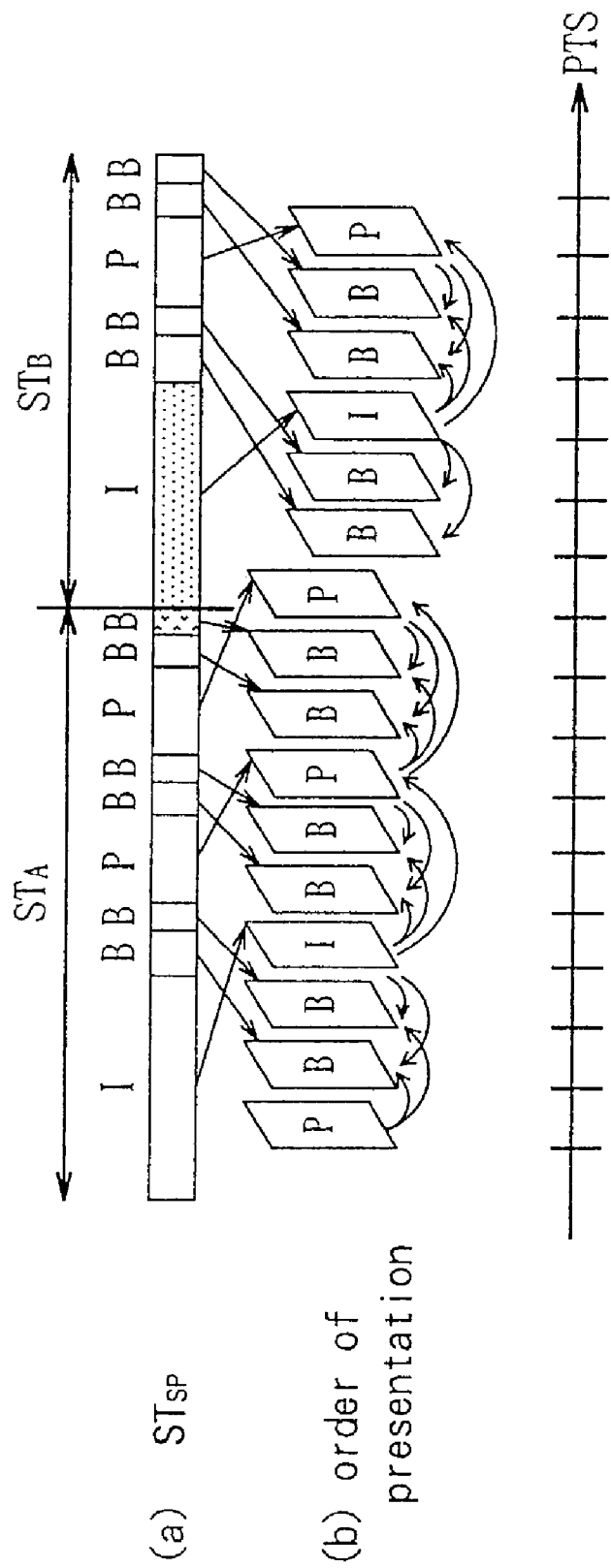
FIGS. 10(a), (b) illustrate motion estimation of the spliced bit stream.
Figure 11:
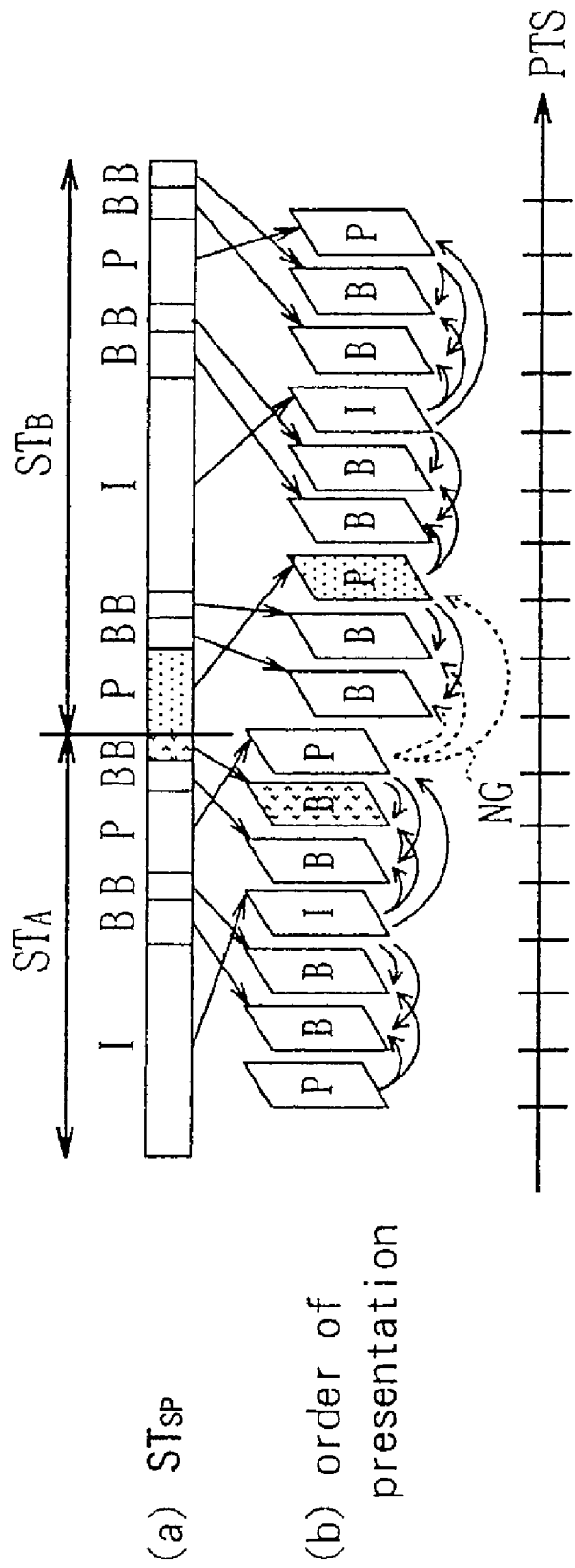
Figure 12:
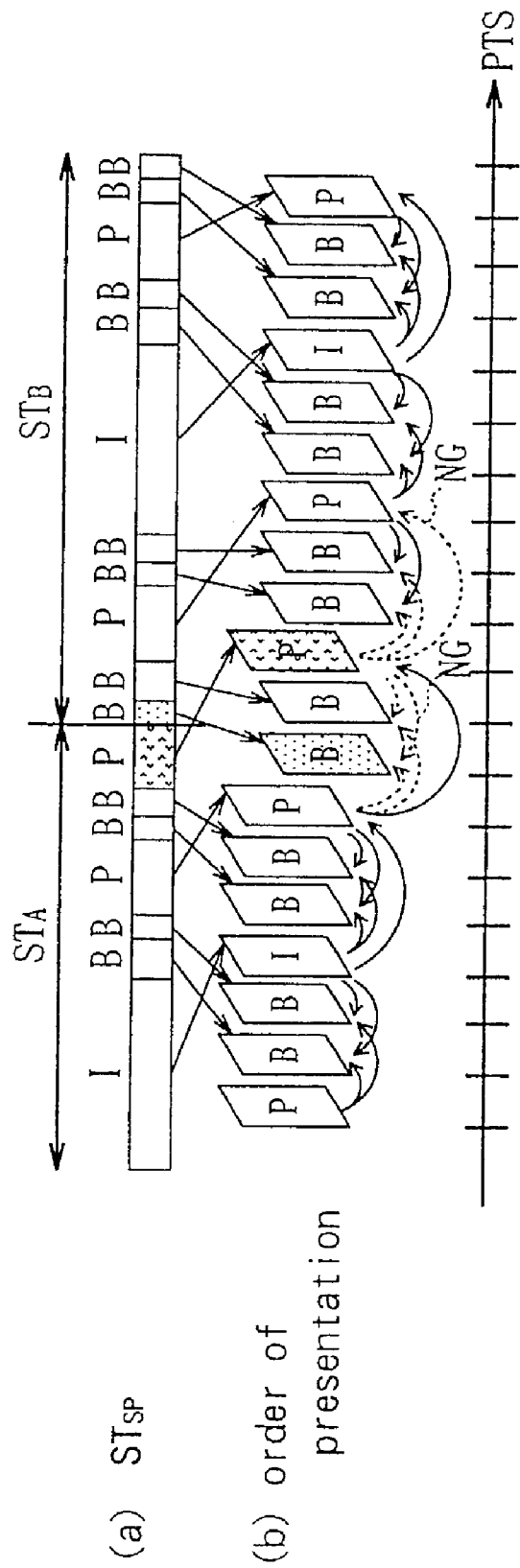
Figure 13:
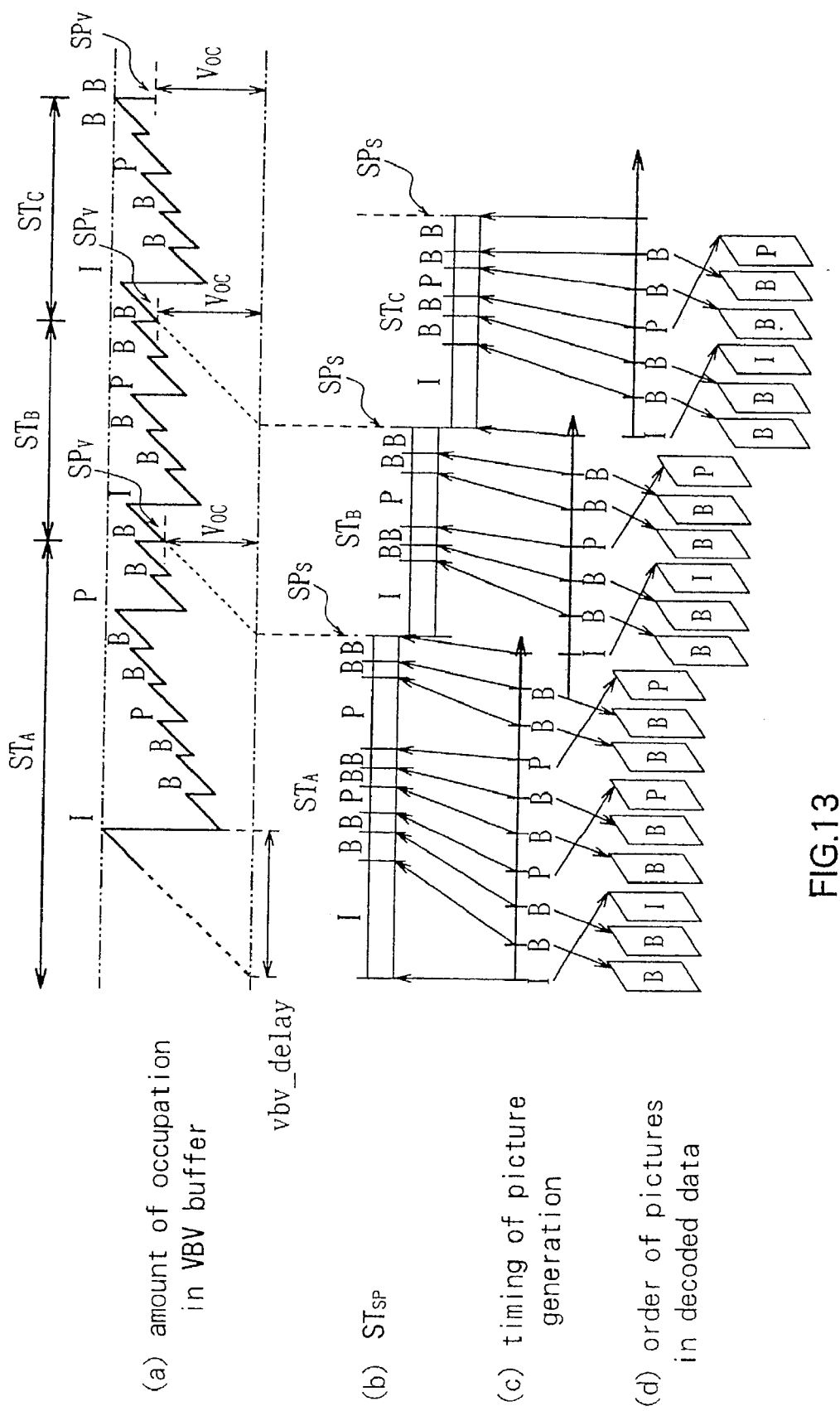
FIGS. 13(a)–(d) illustrate the operation of the video buffer verifier.
Figure 14:
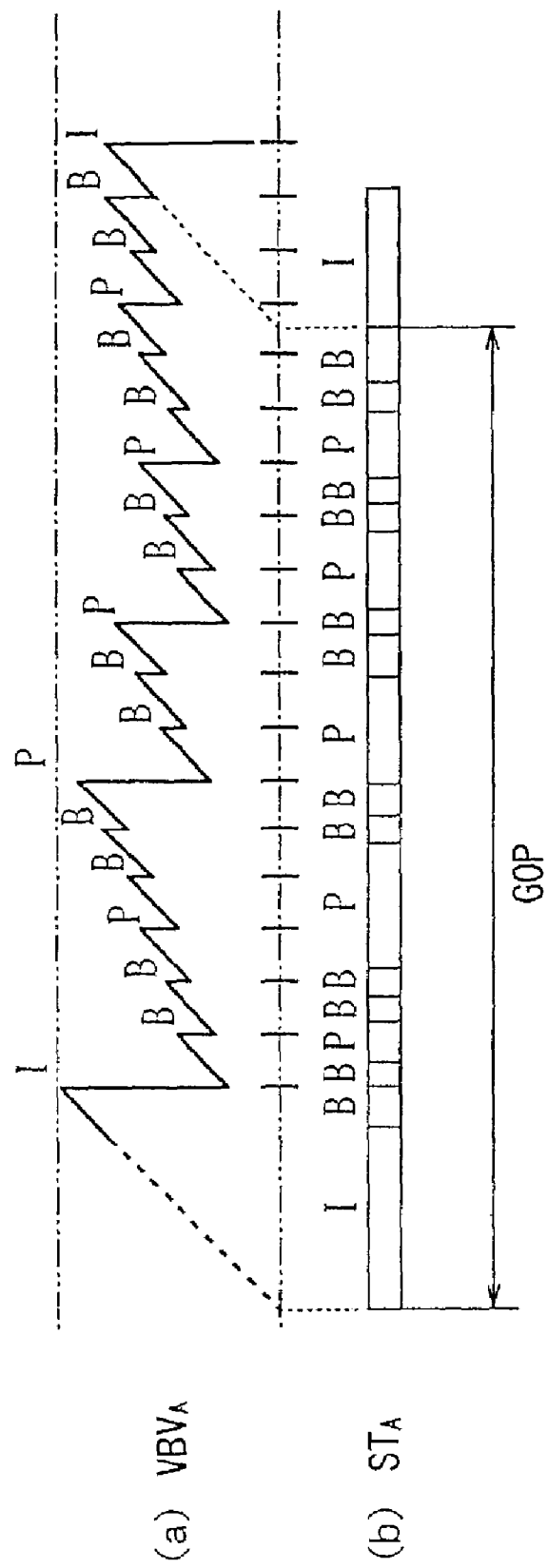
FIGS. 14(a), (b) illustrate the operation of the video buffer verifier storing stream $ST_A$.
Figure 15:
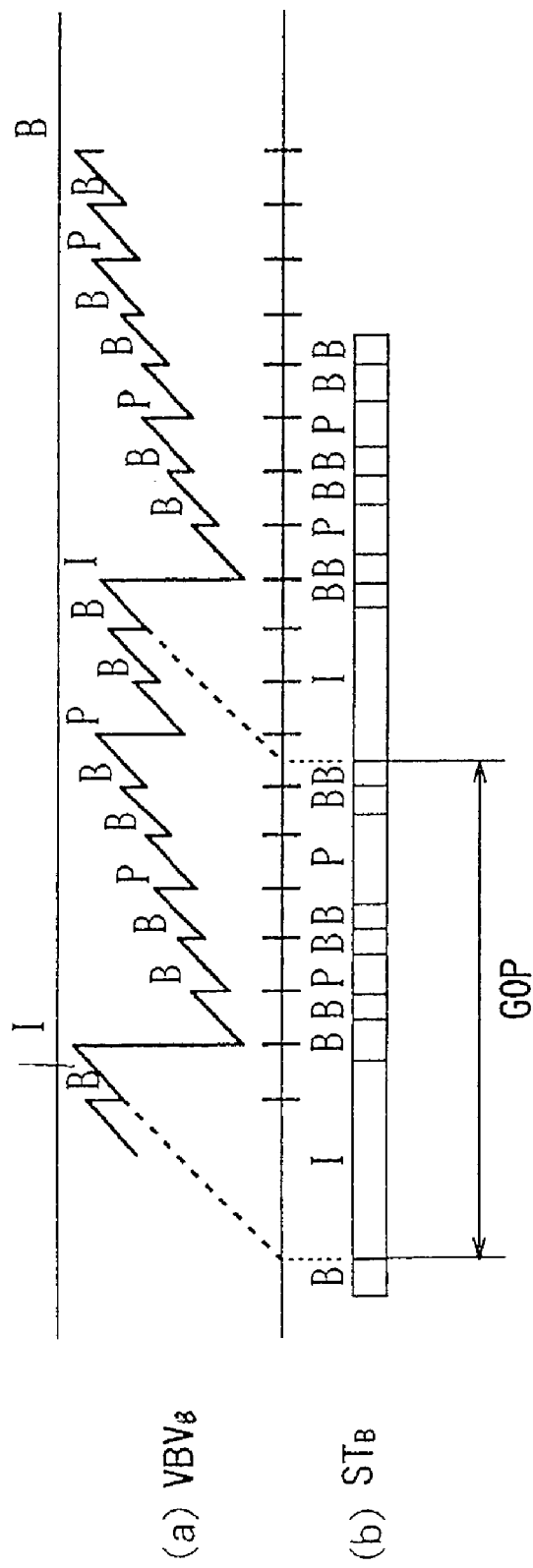
FIGS. 15(a), (b) illustrate the operation of the video buffer verifier storing stream $ST_B$.
Figure 16:
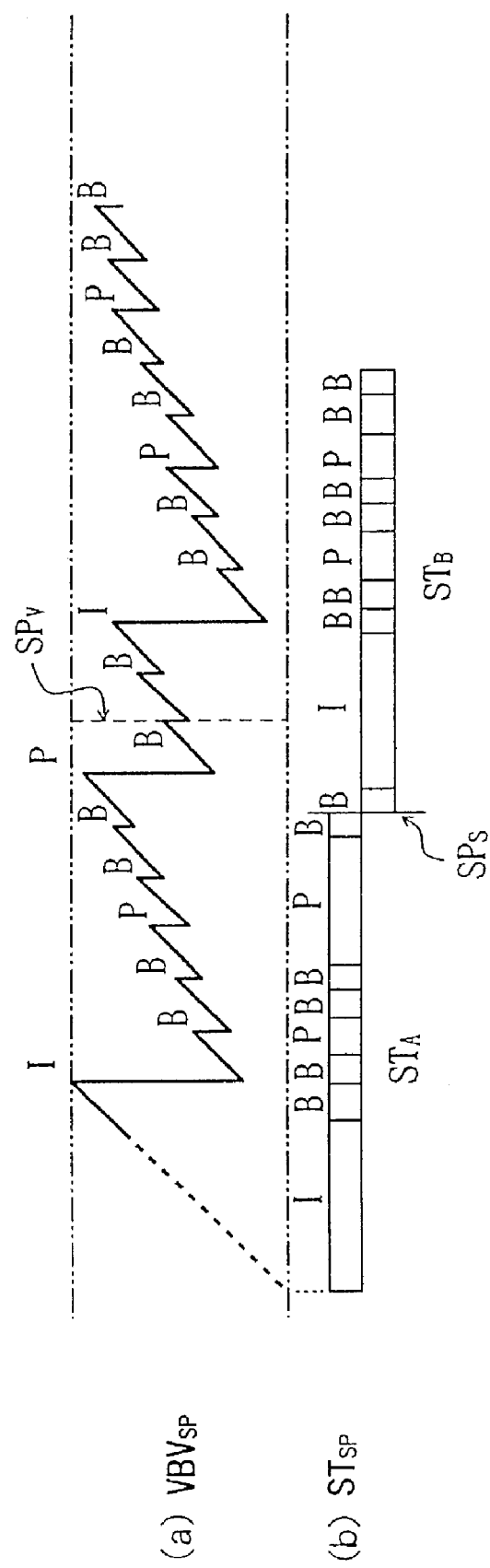
FIGS. 16(a), (b) illustrate the video buffer verifier storing the spliced bit stream.
Figure 17:
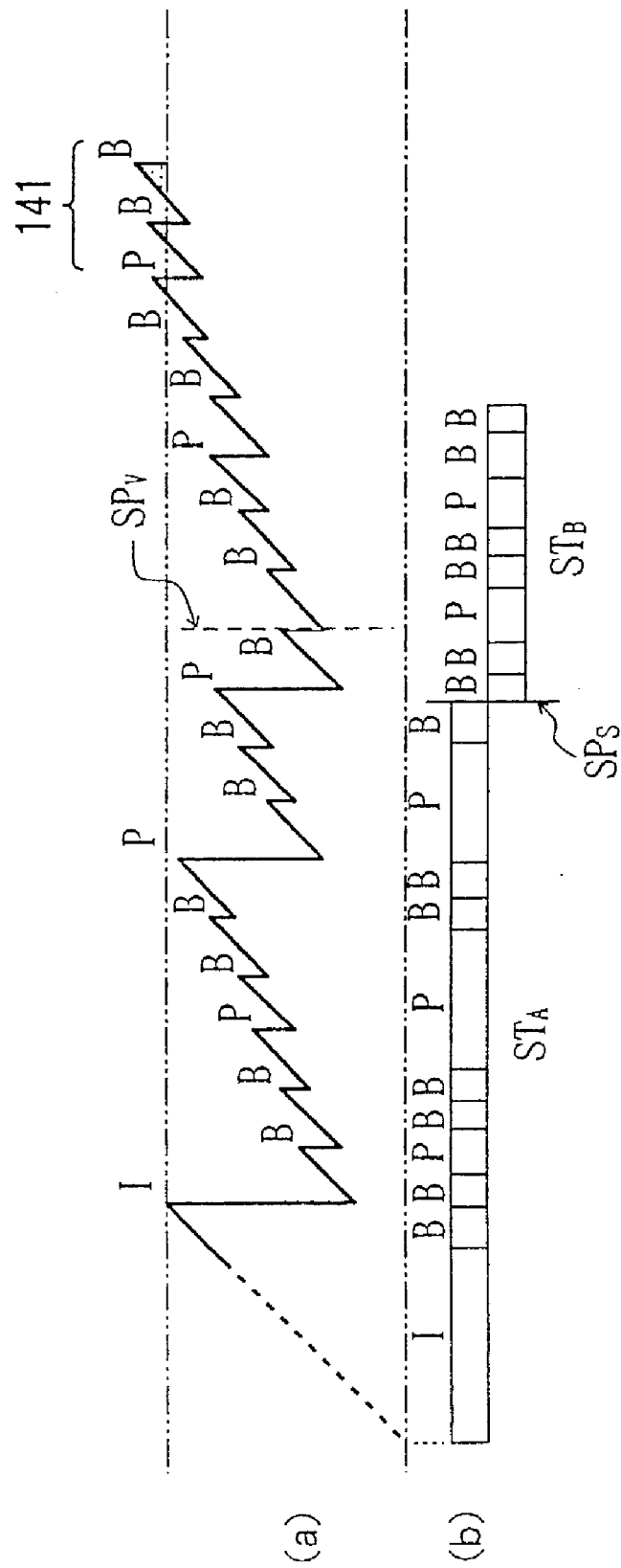
FIGS. 17(a), (b) illustrate an overflow of the video buffer verifier.
Figure 18:
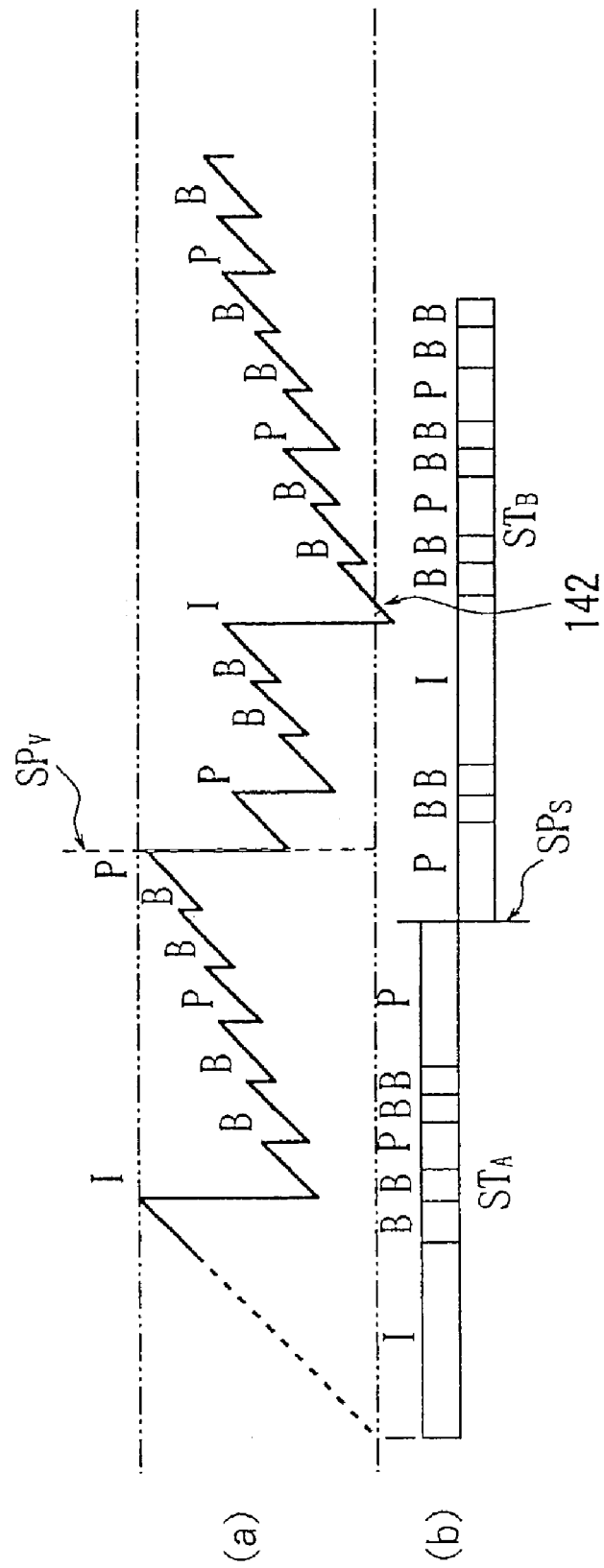
FIGS. 18(a), (b) illustrate an underflow of the video buffer verifier.

FIGS. 23(a), (b) illustrate the solution to the problem of crossover motion compensation. In accordance with the present invention, the splice controller 13 controls the encoder 16 to change a direction of prediction of those pictures which improperly reference pictures in another stream. This occurs, as discussed with reference to FIGS. 11(a), (b), because a B-picture in stream $ST_B$, for example, is originally encoded by the encoder 1B with reference to the P-picture in the same stream. Since the P-picture occurs before the splicing point, however, the B-picture of stream $ST_B$ now improperly refers to a picture in stream $ST_A$. In order to resolve this problem, the splice controller 13 according to the present invention changes the prediction direction.

FIGS. 24(a)–(b) illustrate an example of changing the picture type in accordance with the present invention to prevent an incorrect motion estimation of a particular picture in the region of the splicing point. FIG. 24(a) shows the presentation video data corresponding to stream $ST_A$ and FIG. 24(b) shows the presentation video data corresponding to stream $ST_B$. The encoded stream $ST_A$ is decoded by the decoder 14A (FIG. 19) resulting in the decoded pictures shown in FIG. 25(b). Similarly, the encoded stream $ST_B$ of FIG. 25(d) is decoded by the decoder 14B (FIG. 19) resulting in the decoded pictures of FIG. 25(c). In this example, FIG. 25(b) shows that the B-picture at the splicing point is motion predicted with reference to the following B-frame which occurs after the re-encoding region $REP_A$. If this situation is left uncorrected, the B-picture at the splicing point will be motion estimated upon decoding with reference to the B-picture in the wrong bit stream, i.e., bit stream $ST_B$. Similarly, the P-picture at the splicing point of the bit stream $ST_B$ shown in FIG. 25(c) is motion encoded on the basis of a P-picture occurring outside the re-encoding region $REP_B$. This motion estimation error causes the macroblocks in the frame to be seen and, when compounded by propagation of the error throughout the group of pictures, becomes quite noticeable.

The splice controller 13 in accordance with the present invention changes the picture type of the problematic pictures of the foregoing example. As illustrated in FIGS. 26(a), (b), the B-picture of stream $ST_A$ at the splicing point $A_{n-P0}$ is changed to a P-picture which is motion estimated on the basis of the previous P-picture which is within the re-encoding range of that stream $ST_A$. The P-frame of the stream $ST_B$ is changed to an I-picture which is not motion estimated. It will be appreciated that the B-pictures ($B_{(m-P0)+1}$ and $B_{(m-P0)+1}$) are discarded as shown in FIG. 25(c) when the P-picture is changed to an I-picture and thus do not exist in the picture stream after the re-encoding process is performed. The new picture type may require new prediction direction data and motion vectors. In at least one embodiment, the splice controller 13 provides the encode controller 43 with the encoding information such as the prediction direction and the motion vectors of a previously-coded picture. However, the present invention may also provide new motion prediction data using other techniques such as reconstructing the new picture entirely.

Referring to FIGS. 27(a) to 30(b), a method for calculating a new target amount of bits for image data in a re-encoding range to prevent underflow/overflow in the VBV buffer according to the present invention will now be described. In the figures, $T_{RE}$ represents the re-encode control time, $OST_A$ represents the original stream A and $ST_{RE}'$ represents the stream which is re-encoded resulting in an underflow condition. $OST_B$ represents original stream B, $SP_{VBV}$ represents a splicing point in the VBV buffer and SP represents a splicing point of the streams.

FIGS. 27(a), (b), illustrate the underflow condition. As shown in FIG. 27(a), the locus of the VBV buffer for the stream $ST_{RE}'$ before the splicing point SP corresponds to stream A ($ST_A$). After the splicing point SP, the locus corresponds to stream B ($ST_B$). Since the level of data occupancy of the VBV buffer for stream $ST_A$ at the splicing point is different from the level of data occupancy of the VBV buffer for stream $ST_B$, the data occupancy of the VBV buffer at the splicing point is discontinuous. In actuality, since the streams of $ST_A$, $ST_B$ are seamlessly spliced, the VBV buffer continuously stores the streams without discontinuity. As a result, the VBV buffer occupancy is lower at the splicing point $SP_{VBV}$ by VBV_gap than in the case where the stream $ST_B$ is stored by itself. Because of this artificially-low occupancy level, the VBV buffer suffers an underflow VBV_under when the following I-frame, which typically occupies four times the VBV buffer space as the B- or P-frames, is retrieved from the VBV buffer.

The problem of overflow of the VBV buffer for the spliced streams will now be described with reference to FIGS. 29(a), (b). FIG. 29(a) is a diagram showing a locus of data occupancy in the VBV buffer for the spliced stream $ST_{SP}$ shown in FIG. 29(b). In this case, the level of the data occupancy at the splicing point is artificially-higher as compared with an original locus of the data occupancy in the VBV buffer for stream $ST_B$. As a result, the VBV buffer suffers an overflow when an I-frame is stored in the VBV buffer as shown in the figure.

Overflow occurs because the target bit rate for each picture is too small for the spliced bit stream. The reason for this is that the target bit rate is set for the smaller bit stream $ST_B$ including $VBV_{OST\_B}$ which, as will be seen from FIGS. 27(a), 29(a), is not included in the spliced bit stream $ST_{RE}'$. The underflow condition is the opposite case where the target bit rate is too large for the spliced bit stream $ST_B$. To compound the problem, the locus of the data occupancy of the VBV buffer becomes discontinuous at a point where the stream $ST_{RE}'$ to be re-encoded is switched back to the original stream $OST_B$ which presents an additional overflow/underflow situation.

It is possible to resolve the overflow/underflow problem by controlling the locus $VBV_{OST\_B}$ of the amount of data occupancy of the VBV buffer corresponding to the original stream $OST_B$. However, $VBV_{OST\_B}$ is an optimum locus determined to prevent overflow or underflow of the original stream $OST_B$. If the level of the optimum locus is controlled, there is a possibility that overflow or underflow occurs.

The splice controller 13 operation for setting the new target bit rate will be discussed with reference to FIGS. 19, 28(a), (b) and 30(a), (b). Initially, with reference to FIG. 19, in accordance with a bit count value of stream $ST_A$ and a bit count value of stream $ST_B$ supplied from the stream counter 11, the splice controller 13 calculates a locus of the data occupancy of the VBV buffer for the original stream $OST_A$, a locus of a data occupancy of the VBV buffer for the original stream $OST_B$ and a locus of a data occupancy of the VBV buffer for the stream $ST_{RE}'$ to be re-encoded in a case where stream $ST_A$ and stream $ST_B$ are spliced. The locus of the data occupancy of the VBV buffer in each case can be calculated by subtracting an amount of bits output from the VBV buffer corresponding to the presentation times from the bit count value supplied from the stream counter 11. Therefore, the splice controller 13 is able to virtually recognize the locus of the data occupancy of the VBV buffer for the original stream $OST_A$, the locus of the data occupancy of the VBV buffer for the original stream $OST_B$ and the locus of the data occupancy of the VBV buffer for the stream $ST_{RE}'$ to be re-encoded in a case where stream $ST_A$ and stream $ST_B$ are spliced.

The splice controller 13 references the locus of the data occupancy of stream $ST_{RE}'$, to calculate an amount of overflow/underflow (vbv_over)/(vbv_under) of the stream $ST_{RE}'$ to be re-encoded. Moreover, the splice controller 13 makes reference to the data occupancy of the stream $ST_{RE}'$ and the locus ($VBV_{OST\_B}$) of the data occupancy of the original stream $OST_B$ in the VBV buffer. The splice controller 13 calculates the gap value (vbv_gap) in the VBV buffer at the switching point between the stream $ST_{RE}'$ to be re-encoded and the original stream $OST_B$. The splice controller 13 calculates an offset amount vbv_off of a target amount of codes in accordance with the following Equations (1) and (2):

$$vbv\_off = -(vbv\_under - vbv\_gap) \qquad (1)$$

$$vbv\_off = +(vbv\_over - vbv\_gap) \qquad (2)$$

If the VBV buffer underflows as in the case shown in FIG. 27(a), Equation (1) is used to calculate the offset amount vbv_off. If the VBV buffer overflows as in the case shown in FIG. 29(a), Equation (2) is used to calculate the offset amount vbv_off.

Then, the splice controller 13 uses the offset amount vbv_off obtained in accordance with Equations (1) or (2) to calculate a target amount of codes (a target amount of bits) $TB_{P0}$ in accordance with the following Equation (3):

$$TB_{P0} = \sum_{i=0}^{n0} GB\_A_{(n-P0)+i} \sum_{i=0}^{n0} GB\_B_{(m-P0)-i} + vbv\_off \qquad (3)$$

The target amount of bits $TB_{P0}$ is a value assigned to the picture which is subjected to the re-encoding process. In Equation (3), GB_A is a value indicating an amount of generated bits of a picture which is any one of pictures $A_{n-P0}$ to $A_{(n-P0)+n0}$ in stream $ST_A$ and $\Sigma\, GB\_A_{(n-P0)+i}$ is a sum of the amount of generated bits of the pictures $A_{n-P0}$ to $A_{(n-P0)+n0}$. Similarly, GB_B is a value indicating an amount of generated bits of a picture which is any one of pictures $B_{m-P0}$ to $B_{(m-P0)-m0}$ in stream $ST_B$ and $\Sigma\, GB\_B_{(m-P0)+i}$ is a sum of the amount of generated bits of the pictures $B_{m-P0}$ to $B_{(m-P0)-m0}$.

That is, the target amount of bits $TB_{P0}$ expressed by Equation (3) is a value obtained by adding the offset amount vbv_off of the VBV buffer to the total amount of generated bits of the pictures $A_{(n-P0)+n0}$ to $B_{(m-P0)-m0}$. The offset amount vbv_off is added to correct the target amount of bits $TB_{P0}$ such that the gap of the locus of the data occupancy at the switching point between the stream $ST_{SP}$, which is to be re-encoded, and the original stream $OST_B$ is minimized (preferably zero). With the present invention, seamless splicing is realized.

The splice controller 13 assigns the target amount of bits $TB_{P0}$ obtained in accordance with Equation (3) to the pictures $A_{(n-p0)+n0}$ to $B_{(m-P0)-m0}$. Usually, the quantizing characteristic of each picture is determined in such a manner that the target amount of bits $TB_{P0}$ is distributed at a ratio of I picture:P picture:B picture=4:2:1. The splicing apparatus according to at least one embodiment of the present invention is not so rigid but makes reference to the quantizing characteristics including the previous quantizing steps and the quantizing matrices of the pictures $A_{(n-P0)+n0}$ to $B_{(m-P0)-m0}$ so as to determine a new quantizing characteristic. Specifically, the encode controller 43 makes reference to the quantizing steps and the quantizing matrices included in streams $ST_A$ and $ST_B$. To prevent an excessive deviation from the quantizing characteristic realized in the previous encoder process of the encoders 1A, 1B the encode controller. 43 determines the quantizing characteristic when the re-encoding process is performed.

The present invention in accordance with the foregoing prevents underflow/overflow in the VBV buffer. FIGS. 28(a), (b) illustrate a data occupancy of the VBV buffer when a re-encoding process is performed using the target amount of bits $TB_{P0}$ calculated by the splice controller 13 which resolves the problem of underflow described with reference to FIGS. 27(a), (b). FIGS. 30(a), (b) similarly illustrate a data occupancy of the VBV buffer when a re-encoding process is performed using the target amount of bits $TB_{P0}$ calculated by the splice controller 13 which resolves the problem of overflow described with reference to FIGS. 29(a), (b).

Figure 31:
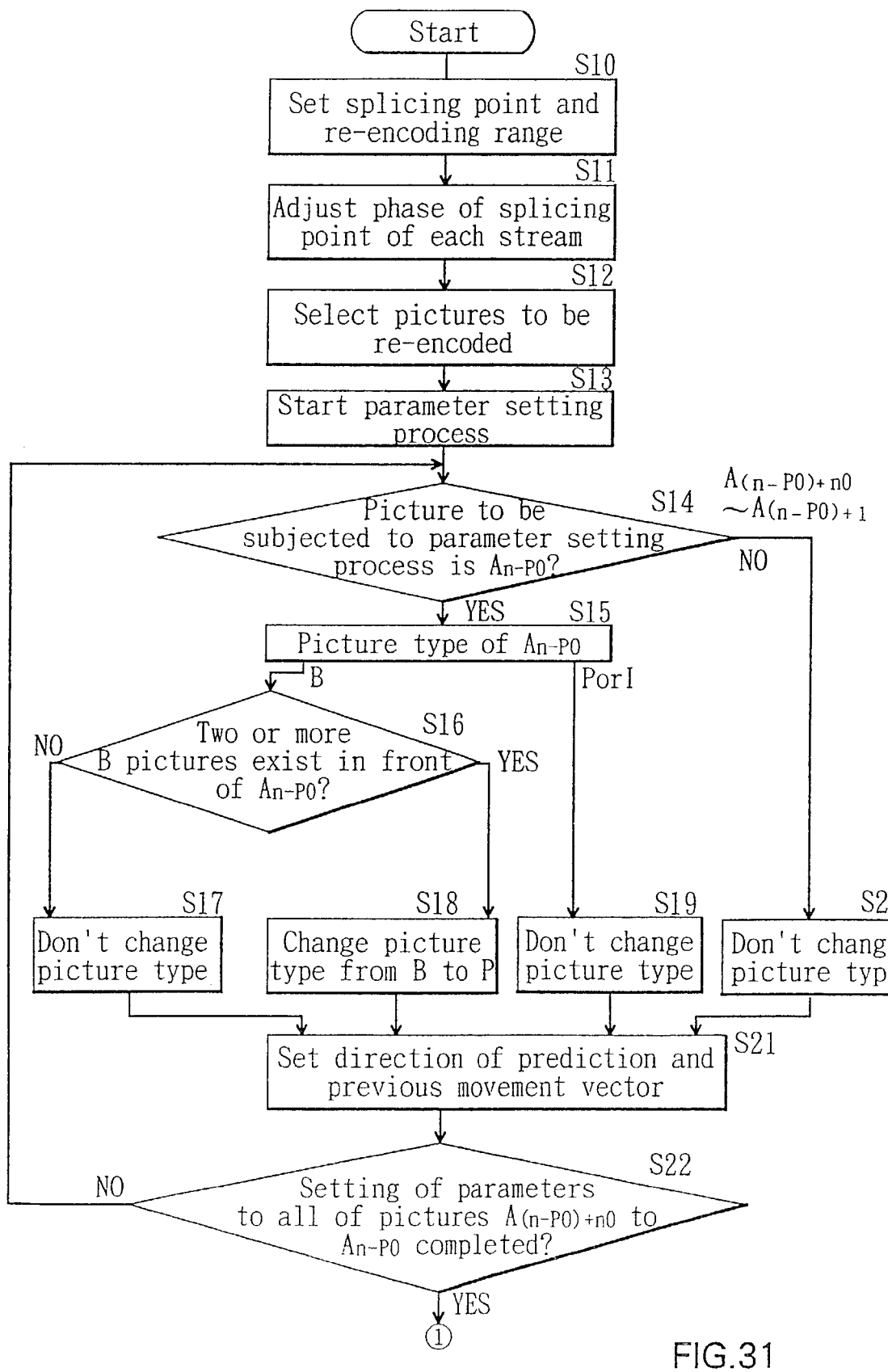
FIG. 31 presents a flow diagram of the present invention.
Figure 32:
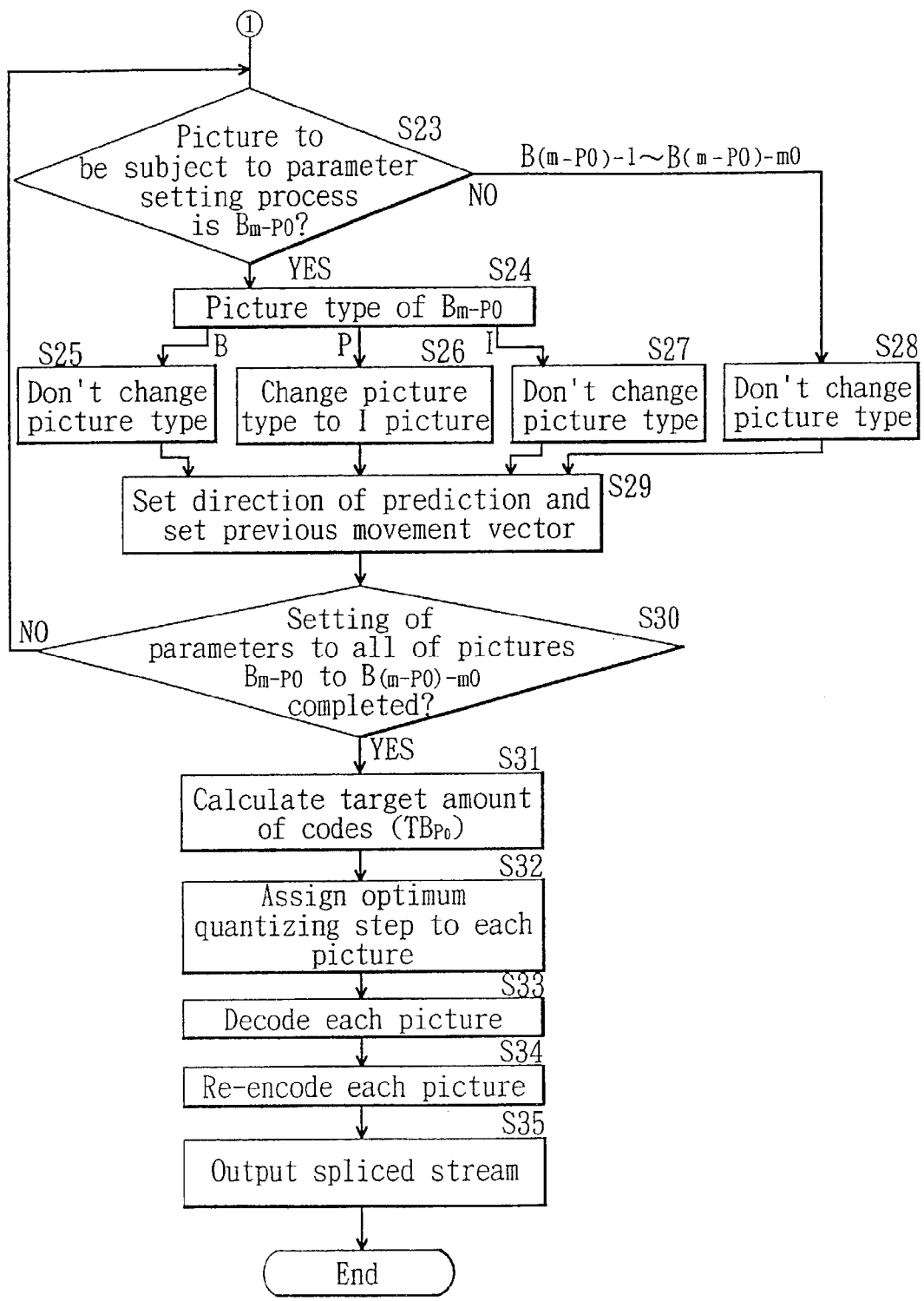
FIG. 32 illustrates a continuation of the flow diagram of FIG. 31.

The operations of the splicing and editing process according to the present invention will be described with reference to FIGS. 31 and 32. The present invention preferably meets regulations of Annex C of ISO13818-2 and ISO11172-2 and Annex L of ISO13818-1 and of course may conform to their encoding/decoding standards.

In step S10, the splice controller 13 receives the splicing point parameter $p_0$ for splicing the streams $ST_A$ and $ST_B$ and re-encoding ranges $n_0$ and $m_0$. It is possible that an operator inputs these parameters. The re-encoding ranges $n_0$ and $m_0$ may be automatically set in accordance with the configuration of the GOP of the stream or the like. In step S11, the splice controller 13 temporarily stores the streams $ST_A$ and $ST_B$ in the buffer memory 10. The phases of the splicing point of each of the streams $ST_A$ and $ST_B$ are synchronized with reference to the presentation time by controlling a reading operation of the buffer memory 10.

In step S12, the splice controller 13 selects a picture to be output for re-encoding while inhibiting a picture in stream $ST_A$ appearing after the picture $A_{n-P0}$. Moreover, the splice controller 13 selects a picture to be output for re-encoding while inhibiting a picture appearing before the picture $B_{m-P0}$ of stream $ST_B$ at the splicing point. FIGS. 25(a),(b) illustrate the situation where a P picture $A_{(n-P0)-2}$ of stream $ST_A$ appears after the picture $A_{n-P0}$ at the splicing point. In an order of presentation, picture $A_{(n-P0)-2}$ is a picture in the future as compared with picture $A_{n-P0}$. Therefore, the P picture $A_{(n-P0)-2}$ is not output in the present invention. Similarly, as shown in FIGS. 25(c) and (d), the B pictures $B_{(m-P0)+2}$ and $B_{(m-P0)+1}$ are before the picture $B_{m-P0}$ at the splicing point. In an order of presentation, pictures $B_{(m-P0)+2}$ and $B_{(m-P0)+1}$ are previous to picture $B_{m-P0}$. Therefore, the B pictures $B_{(m-P0)+2}$ and $B_{(m-P0)+1}$ are not output in the present invention. As described, pictures to be transmitted are selected with reference to the order of presentation, thereby preventing the problem of the presentation order described with reference to FIGS. 9(a)–(d).

In step S13, the splice controller 13 initiates a process for setting the coding parameters required to reconstruct the pictures for re-encoding in accordance with steps S14 to S30. The parameters which are set in this process include the picture type, a direction of prediction and the motion vectors for example.

In step S14, the splice controller 13 determines whether the picture to be subjected to the picture reconstruction process is the picture $A_{n-P0}$ at the splicing point. If so, the operation proceeds to step S15. Otherwise, the operation proceeds to step S20.

In step S15, the splice controller 13 determines whether the picture to be subjected to the picture reconstruction is a B picture, a P picture or an I picture. If the picture to be subjected to the picture reconstruction is a B picture, the operation proceeds to step S17. If the picture to be subjected to the picture reconstruction is a P picture or an I picture, the operation proceeds to step S18.

In step S16, the splice controller 13 determines whether two or more B pictures exist in front of picture $A_{n-P0}$ in the spliced stream $ST_{SP}$. For example, and as shown is FIG. 26(b), if two B pictures ($A_{(n-P0)+2}$, $A_{(n-P0)+3}$) exist in front of picture $A_{n-P0}$, the operation proceeds to step S18. Otherwise, the operation proceeds to step S17. In step S17, the splice controller 13 determines that the change of the picture type of the picture $A_{n-P0}$ is unnecessary. At this time, the splice controller 13 sets a picture type for use in the process for re-encoding the picture $A_{n-P0}$ to the same picture type (the B picture) used previously by the encoder 1A. Therefore, in the re-encoding process in this case the picture $A_{n-P0}$ is re-encoded as the B picture In step S18, the splice controller 13 changes the picture type of the picture $A_{n-P0}$ from the B picture to the P picture. To explain, when two B pictures ($A_{(n-P0)+2}$, $A_{(n-P0)+3}$) exist in front of the B picture ($A_{n-P0}$), there are three B pictures to be re-encoded which are arranged sequentially in the stream $ST_{RE}'$. Since a typical MPEG decoder has only two frame memories for temporarily storing predicted pictures, the third B picture cannot be decoded. Therefore, the present invention changes the picture $A_{n-P0}$ type from the B picture to the P picture type as described with reference to FIGS. 26(a), (b). Thus, the picture $A_{n-P0}$ is reliably decoded as a P picture.

In step S19, the splice controller 13 determines that the change in the picture type of the picture $A_{n-P0}$ is unnecessary. At this time, the splice controller 13 sets the picture type for use when the picture $A_{n-P0}$ is re-encoded to the picture type (the I picture or the P picture) set previously by the encoder 1A.

In step S20, the splice controller 13 determines that the change in the picture type of the picture $A_{n-P0}$ is unnecessary. At this time, the splice controller 13 sets the picture type for use when the picture $A_{n-P0}$ is re-encoded to the picture type (the I picture, the P picture or the B picture) set previously by the encoder 1A.

In step S21, the splice controller 13 sets a direction of prediction and the motion vectors for each picture. In the example shown in FIGS. 25(a)–(d) and 26(a), (b), the picture $A_{n-P0}$ to be subjected to the picture reconstruction process is a B picture in the original stream $OST_A$. In this case, the B picture $A_{n-P0}$ is bi-directionally predicted from the P pictures $A_{(n-P0)+1}$ and $A_{(n-P0)2}$. According to step S12, the P picture $A_{(n-P0)-2}$ is inhibited from being output as the spliced stream and, thus, is prevented from becoming an inversely predicted picture of the picture $A_{n-P0}$ specified in the picture reconstruction process. Therefore, when the picture $A_{n-P0}$ is a B picture, its picture type is unchanged in step S17 and, as such, is subjected to a forward and one-sided prediction in which only the P picture of $A_{(n-P0)+1}$ is employed for prediction. This is similar to the case in step S18 where the B picture is changed to the P picture such that the one-sided prediction parameter for predicting the picture $A_{n-P0}$ is based only on the P picture $A_{(n-P0)+}1$.

The direction of prediction when the picture $A_{n-P0}$ is a P picture in step S19 is unchanged. That is, the splice controller 13 sets a forward and one-sided prediction for the picture $A_{n-P0}$ as in the previous encode process performed by the encoder 1A.

A change in the direction of prediction of the pictures $A_{(n-P0)+n0}$ to $A_{(n-P0)+1}$ as determined in step S20 is unnecessary. That is, the splice controller 13 sets a direction of prediction for the pictures $A_{(n-P0)+n0}$ to $A_{(n-P0)+1}$ as set previously by the encoder 1A. If the two pictures $A_{(n-P0)+1}$ and $A_{n-P0}$ are B pictures predicted from two directions from the forward-directional P picture or I picture and the inverse-directional I picture or the P picture, the prediction for the picture $A_{(n-p0)+1}$ as well as the picture $A_{n-P0}$ must be changed to one-sided prediction such that prediction is performed from only the forward-directional picture.

In step S21, the splice controller 13 determines whether the motion vectors for each picture in the previous encode process performed by the encoder 1A is reused when the re-encoding process is performed in accordance with the newly set direction of prediction. As described above, the motion vectors used in a previous encode process performed by the encoder 1A are the same as in the re-encoding process, i.e., employed for the P picture and the B picture when the direction of prediction of each has not changed. In the examples shown in FIGS. 23(a), (b) and 26(a), (b), the motion vectors used in the previous encode process performed by the encoder 1A are reused when the pictures $A_{(n-P0)+n0}$ to $A_{(n-P0)+1}$ are re-encoded. When the picture $A_{(n-P0)+1}$ and the picture $A_{n-P0}$ are B pictures predicted from both directions from a P picture or an I picture in the forward direction and an I picture or a P picture in the reverse direction, the prediction is changed to one-sided prediction in which prediction is performed in only a forward-directional picture. Therefore, only motion vectors corresponding to the forward-directional picture are used. That is, when the picture $A_{(n-P0)+1}$ and the picture $A_{n-P0}$ are B pictures, the splice controller 13 sets the prediction direction such that the motion vector for the forward-directional picture is used and the inverse-directional motion vector is not used in step S21.

If the picture $A_{n-P0}$ is a picture predicted in one direction, e.g., the inverse direction from only a future picture such as $A_{(n-P0)-2}$, the motion vectors produced in the previous encoder process performed by the encoder 1A are not used. In this case, new motion vectors corresponding to $A_{(n-p0)+1}$ are produced. That is, the splice controller 13 sets the direction of prediction in step S21 such that any previous motion vectors are not used.

In step S22, the splice controller 13 determines whether all parameters of the picture type, the direction of prediction and previous motion vectors of the pictures from pictures $A_{(n-P0)+n0}$ to $A_{n-P0}$ are set. If so, control proceeds to step S23.

In step S23, the splice controller 13 determines whether the picture to be subjected to the picture reconstruction process is a picture $B_{m-P0}$ at the splicing point. If so, the operation proceeds to step S24. Otherwise, if the picture to be subjected to the picture reconstruction is any one of pictures $B_{(m-P0)-1}$ to $B_{(m-p0)+m0}$, the operation proceeds to step S28. In step S24, the splice controller 13 determines whether the picture to be subjected to the picture reconstruction process is a B picture, a P picture or an I picture. If the picture to be subjected to the picture reconstruction process is a B picture, the operation proceeds to step S25. If the picture to be subjected to the picture reconstruction process is a P picture, the operation proceeds to step S26. If the picture to be subjected to the picture reconstruction process is an I picture, the operation proceeds to step S27.

In step S25, the splice controller 13 determines that a change in the picture type of the picture $B_{m-P0}$ in the re-encoding process is unnecessary as in the example shown in FIGS. 22(a)–(d) and 23(a), (b). Thus, the splice controller 13 sets the picture type for use in a re-encoding process of the picture $B_{m-P0}$ to the same picture type (the B picture) as set previously by the encoder 1B.

In step S26, the splice controller 13 changes the picture type of the picture $B_{m-P0}$ from the P picture to the I picture as in the examples shown in FIGS. 25(a)–(d) and 26(a), (b). The reason will now be described. Since the P picture is a one-sided prediction picture which is predicted from the forward-directional I- or P-picture, the P picture is always positioned behind the pictures used for prediction on the stream. If the first picture $B_{m-P0}$ at the splicing point in the stream $ST_B$ is a P picture, prediction must be performed from a forward-directional picture of the stream $ST_A$ which exists in front of the picture $B_{m-P0}$. Since the streams $ST_A$, $ST_B$ are different, it is apparent that the quality of the image obtained by a decoding process deteriorates considerably if the picture type of the first picture $B_{m-P0}$ is set to the P picture. In this case, the splice controller 13 changes the picture type of the B picture to the I picture.

In step S27, the splice controller 13 determines that a change in the picture type of the picture $B_{m-P0}$ is unnecessary. Thus, the splice controller 13 sets the picture for use in the re-encoding process of the picture $B_{m-P0}$ to the same picture type (I picture) set previously by the encoder 1B.

In step S28, the splice controller 13 determines that a change in the picture type of the pictures $B_{(m-P0)-1}$ to $B_{(m-P0)-m0}$ is unnecessary. The splice controller 13 sets the picture for use in the re-encoding process of each of the foregoing pictures to the same picture type (the I picture, the P picture or the B picture) set previously by the encoder 1B.

In step S29, the splice controller 13 sets a direction of prediction and motion vectors for each picture. If the picture $B_{m-P0}$ to be subjected to the picture reconstruction process is, in the original stream $OST_B$, a B picture as in the example shown in FIGS. 22(a)–(d) and 23(a), (b), the picture $B_{m-P0}$ is a picture predicted from two directions, i.e., from the P picture $B_{(m-P0)+1}$ and the I picture $B_{(m-P0)-2}$. As described in step S12, the P picture of $B_{(mP0)+1}$ is not output as a splicing stream and, therefore, is not specified as a forward-directional prediction picture for the picture $B_{m-P0}$ to be subjected to the picture reconstruction process. Therefore, the picture $B_{m-P0}$ which is set such that a change in its picture type is unnecessary in step S25 must be set to perform an inverse and one-sided prediction such that only the I picture $B_{(m-P0)-2}$ is predicted. Therefore, the splice controller 13 sets a direction of prediction for the picture $B_{m-P0}$ to perform the inverse and one-side prediction such that only the I picture $B_{(m-P0)-2}$ is used in the prediction.

A change in the direction of prediction of the pictures $B_{(m-P0)+m0}$ to $B_{(m-P0)+1}$ in step S28 is deemed unnecessary. In this case, the splice controller 13 sets a direction of prediction for the pictures $B_{(m-P0)+m0}$ to $B_{(m-P0)+1}$ to the same picture previously set by the encoder 1B. If the picture $B_{(m-P0)-1}$ is a B picture, a direction of prediction for the $B_{(m-P0)-1}$ is set such that inverse and one-sided prediction is performed so that only the I picture of $B_{(m-P0)-2}$ is predicted. This is similar to the foregoing case in which the picture $B_{m-P0}$ is predicted.

In accordance with the newly set direction of prediction, the splice controller 13 determines in step S29 whether the motion vectors set previously are reused for each picture when the re-encoding process is performed. As described above, the re-encoding process is performed such that the motion vectors used in a previous encode process of the encoder 1B are reused for the P pictures and the B pictures when the prediction direction has not been changed. For example, in FIGS. 22(a)–(d) and 23(a), (b), the motion vectors used in a previous encode process are used for the pictures from the I picture $B_{(m-P0)-2}$ to the P picture $B_{(m-P0)-m0}$. The direction of prediction for each of the pictures $B_{m-P0}$ and $B_{(m-P0)-1}$ predicted from the two directions, e.g., from the P picture $B_{(m-P0)+1}$ and the I picture of $B_{(m-P0)-2}$, in a previous encoder process performed by the encoder 1B is changed to one-sided prediction such that only the I picture $B_{(m-P0)-2}$ is used for prediction. Therefore, the motion vectors corresponding to the picture $B_{(m-P0)+1}$ are not used. That is, in step S29, the splice controller 13 reuses the previous motion vectors for only one direction for the pictures $B_{m-P0}$ and $B_{(m-P0)-1}$. That is, the motion vectors for the inverse direction are not used.

Next, in step S30, the splice controller 13 determines whether the parameters relating to the picture type, the direction of prediction and the motion vectors for all of the pictures from the picture $B_{m-P0}$ to the picture $B_{(m-P0)-m0}$ are set. If so, the splice controller 13 in step S31 calculates a target amount of bits ($TB_{P0}$) to be generated in the re-encoding period in accordance with Equation (3). Specifically, the splice controller 13 initially calculates a locus of the data occupancy of the VBV buffer for the original stream $OST_A$, a locus of the data occupancy of the VBV buffer for the original stream $OST_B$ and a locus of the data occupancy of the VBV buffer for the stream $ST_{RE}'$ to be encoded in a case where streams $ST_A$, $ST_B$ are spliced in accordance with a bit count value of stream $ST_A$ and the bit count value of stream $ST_B$ supplied from the stream counter 11. Then, the splice controller 13 analyzes the virtually-obtained locus of the data occupancy of the VBV buffer for the stream $ST_{RE}'$ to be re-encoded.

Thus, the splice controller 13 calculates an amount of underflow (vbv_under) or an amount of overflow (vbv_over) of the stream $ST_{RE}'$ to be re-encoded. Moreover, the splice controller 13 compares the virtually-obtained locus of the data occupancy of the VBV buffer for stream $ST_{RE}'$ to be re-encoded and a locus ($VBV_{OST\_B}$) of the data occupancy in the VBV buffer for the original stream $OST_B$. Thus, the splice controller 13 calculates a gap value (vbv_gap) of the VBV buffer at a switching point between stream $ST_{RE}'$ to be re-encoded and the original stream $OST_B$. Then, the splice controller 13 calculates an offset amount vbv_off of the target amount of codes in accordance with Equations (1) and (2). Then, the splice controller 13 uses the offset amount vbv_off calculated in accordance with Equation (1) or (2) to calculate a target amount of codes (target amount of bits) $TB_{P0}$ in accordance with Equation (3).

In step S32, the splice controller 13 determines a quantizing characteristic to be set for each picture. The quantizing characteristic is determined in accordance with an assignment to the pictures $A_{(n-P0)+n0}$ to $B_{(m-P0)-m0}$ of the target amount of bits $TB_{P0}$ calculated in accordance with Equation (3). The splicing apparatus according to the present invention makes reference to quantizing characteristics including the previous quantizing steps and the quantizing matrices of each of the pictures $A_{(n-P0)+n0}$ to $B_{(m-P0)-m0}$ used by the encoders 1A and 1B so as to determine new quantizing characteristics. Specifically, the splice controller 13 initially receives from the stream analyzing portion 12 information about the coding parameters, quantizing steps and quantizing matrices produced in a previous coding process performed by the encoders 1A and 1B and included in the streams $ST_A$, $ST_B$.

Further, the splice controller 13 makes reference to the amounts of codes (bits) assigned to the target amount of bits $TB_{P0}$ and information of the previous coding parameters. The splice controller 13 determines the quantizing characteristics when the re-encoding process is performed so as to prevent excessive deviation from the quantizing characteristics in the encoding processes performed by the encoders 1A and 1B. As described in steps S18 and S26, the quantizing characteristics of the pictures, the picture type of each of which has been changed by the picture reconstruction process, are newly calculated when the re-encoding process is performed without reference to the information of the quantizing steps and the quantizing matrices.

In step S33, the splice controller 13 decodes the pictures $A_{(n-P0)+n0}$ to $B_{(m-P0)-m0}$ included in the re-encoding range. In step S34, the splice controller 13 uses the quantizing characteristics set to pictures $A_{(n-P0)+n0}$ to $B_{(m-P0)-m0}$ while controlling the amount of generated bits. If the splice controller 13 reuses the previous motion vectors, the encode controller 43, at the control of the splice controller 13, causes switch 44 to channel the previous motion vectors to the motion compensation portion 41. When the previous motion vectors are not used, the encode controller 43 controls the switch 44 to channel the motion vectors newly produced by the motion detection circuit 42 to the motion compensation portion 41. At this time, the encode controller 43 controls the frame memories 39 and 40 in accordance with information about the picture type supplied from the splice controller 13 to store the pictures required to produce predicted image data. The encode controller 43 sets, to the quantizing circuit 34 and the inverse quantization circuit 36, the quantizing characteristics in the re-encoding range supplied from the splice controller 13.

In step S35, the splice controller 13 controls the switch 17 to selectively output stream $ST_A$ from the buffer 10, stream $ST_B$ from the buffer 10 or the re-encoded stream $ST_{RE}$ from the MPEG encoder 16. Thus, the splice controller 13 seamlessly-splices stream $ST_A$ which appears before the re-encoding range, re-encoded stream $ST_{RE}$ in the re-encoding range and stream $ST_B$ which appears after the re-encoding range to provide seamlessly-spliced bit stream $ST_{SP}$.

Although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

What is claimed is:

1. A splicing apparatus for splicing a plurality of source encoded bit streams, comprising:
   splicing-point setting means for setting an intended splicing point for said plurality of source encoded bit streams;
   determining means for determining an amount of each of said encoded bit streams to be decoded in a region preceding and succeeding said intended splicing point;
   decoding means for decoding pictures included in a plurality of each of said source encoded bit streams in said region of said intended splicing point to generate decoded video data;
   splicing means for splicing decoded bit streams of said intended splicing point;
   re-encoding means for re-encoding said decoded video data to generate a re-encoded stream;
   spliced-stream producing means for switching between said source encoded bit streams and said re-encoded stream to produce a spliced stream; and
   splice control means for controlling said re-encoding means and said spliced-stream producing means so as to prevent a discontinuity of said spliced stream when said spliced stream is decoded.

2. A splicing apparatus according to claim 1, wherein a decoding-side for decoding said spliced stream includes a video buffer verifier (VBV); wherein the splice control means calculates a target amount of bits upon re-encoding said decoded video data by the re-encoding means so as to prevent overflow and underflow of said VBV buffer; and the re-encoding means encodes the decoded video data in accordance with the target amount of bits generated by the splice control means.

3. The splicing apparatus according to claim 1 wherein the splice control means fetches coding parameters included in the source encoded streams and selectively reuses the fetched coding parameters when re-encoding is performed by the re-encoding means so as to prevent deterioration in image quality of the spliced stream.

4. The splicing apparatus according to claim 1, wherein the splice control means fetches information about a quantizing characteristic included in the source encoded streams and controls the re-encoding means to perform the re-encoding process in accordance with the fetched quantizing characteristic.

5. The splicing apparatus according to claim 1, wherein a decoding-side decodes said spliced stream includes a video buffer verifier (VBV) characterized by a data occupancy;
wherein the splice control means fetches for each picture quantizer information included in the source encoded streams,
calculates a target amount of bits for each picture re-encoded in re-encoding said decoded video data by the re-encoding means so as to prevent overflow and underflow of the VBV buffer,
fetches, for each picture, quantizer information included in the source encoded streams and calculates new quantizer information in accordance with the quantizer information fetched from the source encoded stream and the calculated target amount of bits, and
controls the re-encoding means to cause the re-encoding means to perform the re-encoding process in accordance with the new quantizer information.

6. The splicing apparatus according to claim 1, wherein a decoding-side decodes said spliced stream includes a video buffer verifier (VBV) characterized by a data occupancy;
wherein the splice control means calculates a target amount of bits in re-encoding said decoded video data by the re-encoding means so as to prevent overflow and underflow of the VBV buffer,
assigns the target amount of bits to each picture to be re-encoded by making reference to a quantizer information which had been generated in a previous coding process and included in the source encoded streams, and
controls the re-encoding means to perform the re-encoding process for each picture in accordance with the target amount of bits assigned to each picture.

7. The splicing apparatus according to claim 1, wherein a decoding-side decodes said spliced stream includes a video buffer verifier (VBV) characterized by a data occupancy;
wherein the splice control means calculates a target amount of bits in re-encoding the decoded video data by the re-encoding means so as to prevent overflow and underflow of the VBV buffer,
assigns the target amount of bits to each picture to be re-encoded so as to approximate the target amount of bits to an amount of generated bits for each picture in a previous coding process of the source encoded streams, and
controls the re-encoding means to perform re-encoding for each picture in accordance with the target amount of bits assigned.

8. The splicing apparatus according to claim 1, wherein the splice control means selectively reuses motion vector information fetched from the source coded streams in the re-encoding process which is performed by the re-encoding means so as to prevent deterioration in the image quality of the spliced stream.

9. The splicing apparatus according to claim 1, wherein the re-encoding means incorporates motion detection means for detecting motion of each picture to produce a motion vector, and
motion compensation means for performing motion compensation in accordance with the motion vector detected by the motion detection means, and
the splice control means determines whether motion vector information fetched from the source coded streams is reused in re-encoding the decoded video data by the re-encoding means, and
controls the re-encoding means to supply the motion vector fetched from the stream to a motion compensation circuit of the re-encoding means in place of the motion vector detected by the motion detection means when a determination has been made that the motion vector information is reused.

10. The splicing apparatus according to claim 1, wherein the splice control means set a direction of prediction of a picture which is positioned adjacent to the spliced point and which is subjected to the re-encoding process by the re-encoding means so as to prevent prediction from pictures in different source coded streams positioned opposite with respect to the spliced point.

11. The splicing apparatus according to claim 1, wherein the splice control means selectively changes a picture type of a picture which is positioned adjacent the spliced point and which is re-encoded by the re-encoding means so as to prevent deterioration in image quality of the pictures included in the spliced stream and positioned adjacent to the spliced points.

12. The splicing apparatus according to claim 1, wherein the splice control means selectively changes the picture type of a picture which is re-encoded by the re-encoding means and which is positioned adjacent to the spliced point so as to prevent prediction from pictures in different source coded streams positioned opposite with respect to the spliced point.

13. The splicing apparatus according to claim 1, wherein the plurality of source coded streams include at least a first encoded stream and a second encoded stream, and
the splice control means selects output pictures from the plurality of pictures which constitute the first encoded stream so as to prevent an output of a future picture in a time axis of presentation as the spliced stream to a first spliced point set to the first encoded stream, and
selects output pictures from the plurality of pictures which constitute the second encoded stream so as to prevent an output of a previous picture in a time axis of presentation to a second spliced point set to the second coded stream.

14. The splicing apparatus according to claim 1, wherein a decoding-side decodes said spliced stream includes a video buffer verifier (VBV) characterized by a data occupancy;
wherein the plurality of source encoded streams include at least a first encoded stream and a second encoded stream, and
the splice control means selects output pictures from the plurality of pictures which constitute the first encoded stream so as to prevent an output of a future picture in a time axis of presentation as the spliced stream to a first spliced point set to the first encoded stream, selects output pictures from the plurality of pictures which constitute the second encoded stream so as to prevent an output of a previous picture in a time axis of presentation to a second spliced point set to the second coded stream, sets a picture type and a direction of prediction of a picture which is re-encoded by the re-encoding means and which is positioned adjacent to the spliced point, sets motion vector information fetched from the source encoded streams to a picture which is reused in the re-encoding process which is performed by the re-encoding means, calculates a target amount of bits in the re-encoding process which is performed by the re-encoding means so as to prevent overflow and underflow of the VBV buffer, assigns the target amount of bits to each of pictures to be re-encoded so as to approximate the target amount of bits to an amount of generated bits for each picture in a previous coding process of the source coded stream, and controls the re-encoding means to cause the re-encoding means to perform the re-encoding process for each picture in accordance with the target amount of bits assigned to each picture, the direction of prediction, the picture type and the motion vector.

15. The splicing apparatus according to claim 1, wherein said splice control means is an editing means for editing said source encoded streams.

16. A splicing method for splicing a plurality of source encoded bit streams to produce a spliced stream, comprising the steps of:

setting intended splicing points for said plurality of source encoded bit streams;

determining an amount of each of said encoded bit streams to be decoded in a region preceding and succeeding said intended splicing point;

decoding pictures in said region of said splicing points of a plurality of each of said source encoded bit streams and generating decoded video data;

splicing decoded bit streams of said intended splicing point;

re-encoding said decoded video data to generate a re-encoded stream;

performing switching between said source encoded bit streams and said re-encoded stream to effect output so as to produce said spliced stream; and controlling the re-encoding step and said spliced stream producing step so as to prevent a discontinuity of said spliced stream when said spliced stream is decoded.

17. The splicing method according to claim 16, wherein a decoding-side for decoding the spliced stream includes a video buffer verifier (VBV);

wherein the splice control step calculates a target amount of bits upon re-encoding said decoded video data in the re-encoding step so as to prevent overflow and underflow of a VBV buffer; and the re-encoding step encodes the decoded video data in accordance with the target amount of bits generated in the splice control step.

18. The splicing method according to claim 16, wherein the splice control step fetches a coding parameter included in the source encoded streams and selectively reuses the fetched coding parameter when the re-encoding process is performed in the re-encoding step so as to prevent deterioration in image quality of the spliced stream.

19. The splicing method according to claim 16, wherein the splice control step fetches quantizer information included in the source encoded streams and controls the re-encoding step to perform the re-encoding process in accordance with the fetched quantizer information.

20. The splicing method according to claim 16, wherein said spliced control step edits the source encoded streams.

21. A splicing apparatus for splicing a plurality of source encoded bit streams, comprising:

splicing-pointer for selling an intended splicing point for said plurality of source encoded bit streams;

a calculator for determining an amount of each of said encoded bit streams to be decoded in a region preceding and succeeding said intended splicing point;

a decoder for decoding pictures included in a plurality of each of said source encoded bit streams in said region of said splicing point to generate decoded video data;

a splicer for splicing decoded bit streams of said intended splicing point;

a re-encoder for re-encoding said decoded video data to generate a re-encoded stream;

a spliced-stream switcher for switching between said source encoded bit streams and said re-encoded stream to produce a spliced stream; and a splice controller for controlling said re-encoder and said spliced-stream switcher so as to prevent a discontinuity of said spliced stream when said spliced stream is decoded.

22. The splicing apparatus according to claim 21, wherein a decoding-side for decoding said spliced stream includes a video buffer verifier (VBV); wherein the splice controller calculates a target amount of bits upon re-encoding said decoded video data by the re-encoder so as to prevent overflow and underflow of said VBV buffer; and the re-encoder encodes the decoded video data in accordance with the target amount of bits generated by the splice controller.

23. The splicing apparatus according to claim 21, wherein the splice controller fetches coding parameters included in the source encoded streams and selectively reuses the fetched coding parameters when re-encoding is performed by the re-encoder so as to prevent deterioration in image quality of the spliced stream.

24. The splicing apparatus according to claim 21, wherein the splice controller fetches information about a quantizing characteristic included in the source encoded streams and controls the re-encoder to perform the re-encoding process in accordance with the fetched quantizing characteristic.

25. The splicing apparatus according to claim 21, wherein a decoding-side decodes said spliced stream includes a video buffer verifier (VBV) characterized by a data occupancy;

wherein the splice controller fetches for each picture quantizer information included in the source encoded streams, calculates a target amount of bits for each picture re-encoded in re-encoding said decoded video data by the re-encoder so as to prevent overflow and underflow of the VBV buffer, fetches, for each picture, quantizer information included in the source encoded streams and calculates new quantizer information in accordance with the quantizer information fetched from the source encoded stream and the calculated target amount of bits, and controls the re-encoder to cause the re-encoder to perform the re-encoding process in accordance with the new quantizer information.

26. The splicing apparatus according to claim 21, wherein a decoding-side decodes said spliced stream includes a video buffer verifier (VBV) characterized by a data occupancy;
wherein the splice controller calculates a target amount of bits in re-encoding said decoded video data by the re-encoder so as to prevent overflow and underflow of the VBV buffer,
assigns the target amount of bits to each picture to be re-encoded by making reference to a quantizer information which had been generated in a previous coding process and included in the source encoded streams, and
controls the re-encoder to perform the re-encoding process for each picture in accordance with the target amount of bits assigned to each picture.

27. The splicing apparatus according to claim 21, wherein a decoding-side decodes said spliced stream includes a video buffer verifier (VBV) characterized by a data occupancy;
wherein the splice controller calculates a target amount of bits in re-encoding the decoded video data by the re-encoder so as to prevent overflow and underflow of the VBV buffer,
assigns the target amount of bits to each picture to be re-encoded so as to approximate the target amount of bits to an amount of generated bits for each picture in a previous coding process of the source encoded streams, and
controls the re-encoder to perform re-encoding for each picture in accordance with the target amount of bits assigned.

28. The splicing apparatus according to claim 21, wherein the splice controller selectively reuses motion vector information fetched from the source coded streams in the re-encoding process which is performed by the re-encoder so as to prevent deterioration in the image quality of the spliced stream.

29. The splicing apparatus according to claim 21, wherein the re-encoder incorporates a motion detector for detecting motion of each picture to produce a motion vector, and
a motion compensator for performing motion compensation in accordance with the motion vector detected by the motion detector, and
the splice controller determines whether motion vector information fetched from the source coded streams is reused in re-encoding the decoded video data by the re-encoder, and
controls the re-encoder to supply the motion vector fetched from the stream to a motion compensation circuit of the re-encoder in place of the motion vector detected by the motion detector when a determination has been made that the motion vector information is reused.

30. The splicing apparatus according to claim 21, wherein the splice controller set a direction of prediction of a picture which is positioned adjacent to the spliced point and which is subjected to the re-encoding process by the re-encoder so as to prevent prediction from pictures in different source coded streams positioned opposite with respect to the spliced point.

31. The splicing apparatus according to claim 21, wherein the splice controller selectively changes a picture type of a picture which is positioned adjacent the spliced point and which is re-encoded by the re-encoder so as to prevent deterioration in image quality of the pictures included in the spliced stream and positioned adjacent to the spliced points.

32. The splicing apparatus according to claim 21, wherein the splice controller selectively changes the picture type of a picture which is re-encoded by the re-encoder and which is positioned adjacent to the spliced point so as to prevent prediction from pictures in different source coded streams positioned opposite with respect to the spliced point.

33. The splicing apparatus according to claim 21, wherein the plurality of source coded streams include at least a first encoded stream and a second encoded stream, and
the splice controller selects output pictures from the plurality of pictures which constitute the first encoded stream so as to prevent an output of a future picture in a time axis of presentation as the spliced stream to a first spliced point set to the first encoded stream, and
selects output pictures from the plurality of pictures which constitute the second encoded stream so as to prevent an output of a previous picture in a time axis of presentation to a second spliced point set to the second coded stream.

34. The splicing apparatus according to claim 21, wherein a decoding-side decodes said spliced stream includes a video buffer verifier (VBV) characterized by a data occupancy;
wherein the plurality of source encoded streams include at least a first encoded stream and a second encoded stream, and
the splice controller selects output pictures from the plurality of pictures which constitute the first encoded stream so as to prevent an output of a future picture in a time axis of presentation as the spliced stream to a first spliced point set to the first encoded stream,
selects output pictures from the plurality of pictures which constitute the second encoded stream so as to prevent an output of a previous picture in a time axis of presentation to a second spliced point set to the second coded stream,
sets a picture type and a direction of prediction of a picture which is re-encoded by the re-encoder and which is positioned adjacent to the spliced point,
sets motion vector information fetched from the source encoded streams to a picture which is reused in the re-encoding process which is performed by the re-encoder,
calculates a target amount of bits in the re-encoding process which is performed by the re-encoder so as to prevent overflow and underflow of the VBV buffer,
assigns the target amount of bits to each of pictures to be re-encoded so as to approximate the target amount of bits to an amount of generated bits for each picture in a previous coding process of the source coded stream, and
controls the re-encoder to cause the re-encoder to perform the re-encoding process for each picture in accordance with the target amount of bits assigned to each picture, the direction of prediction, the picture type and the motion vector.

35. The splicing apparatus according to claim 21, wherein said splice controller is an editor for editing said source encoded streams.

* * * * *